US012674940B2

(12) United States Patent
Laming et al.

(10) Patent No.: US 12,674,940 B2
(45) Date of Patent: Jul. 7, 2026

(54) OPTICAL FIBER POSITIONING APPARATUS COMPRISING ONE OR MORE APPARATUS ALIGNMENT FEATURES

(71) Applicant: Intel Corporation, Santa Clara, CA (US)

(72) Inventors: Richard Laming, Livingston (GB); Nicholas D. Psaila, Lanark (GB)

(73) Assignee: Intel Corporation, Santa Clara, CA (US)

( * ) Notice: Subject to any disclaimer, the term of this patent is extended or adjusted under 35 U.S.C. 154(b) by 248 days.

(21) Appl. No.: 18/553,448

(22) PCT Filed: Jun. 28, 2022

(86) PCT No.: PCT/GB2022/051657
§ 371 (c)(1),
(2) Date: Sep. 29, 2023

(87) PCT Pub. No.: WO2023/275532
PCT Pub. Date: Jan. 5, 2023

(65) Prior Publication Data
US 2024/0201445 A1     Jun. 20, 2024

(30) Foreign Application Priority Data

Jun. 28, 2021     (GB) ..................................... 2109288
Jun. 28, 2021     (GB) ..................................... 2109289

(Continued)

(51) Int. Cl.
*G02B 6/36*          (2006.01)
*G02B 6/38*          (2006.01)
*G02B 6/42*          (2006.01)

(52) U.S. Cl.
CPC ......... *G02B 6/3636* (2013.01); *G02B 6/3644* (2013.01); *G02B 6/3676* (2013.01);
(Continued)

(58) Field of Classification Search
CPC ... G02B 6/3636; G02B 6/3644; G02B 6/3676
See application file for complete search history.

(56) References Cited

U.S. PATENT DOCUMENTS 4,405,207 A     9/1983  Kay
5,550,943 A     8/1996  Elderstig et al.
(Continued)

FOREIGN PATENT DOCUMENTS

EP          729044 B1      1/2003
EP          1584959 A1    10/2005
(Continued)

OTHER PUBLICATIONS

PCT International Search Report and Written Opinion issued in PCT/EP2021/074508, dated Mar. 17, 2022; 15 pages.
(Continued)

*Primary Examiner* — Sung H Pak
(74) *Attorney, Agent, or Firm* — Alliance IP, LLC

(57) ABSTRACT

An apparatus for positioning one or more optical fibers relative to the apparatus, comprises a body comprising a monolithic block of material, one or more fiber alignment structures formed in the material of the monolithic block, each fiber alignment structure comprising a groove configured to accommodate a corresponding optical fiber, and one or more apparatus alignment features formed in the material of the monolithic block, wherein the one or more apparatus alignment features are additional to the one or more fiber alignment structures and wherein the one or more apparatus alignment features have a known spatial relationship relative to the one or more fiber alignment structures. The one or more apparatus alignment features may enable passive alignment of the apparatus relative to a member which is separate from the apparatus such as an optical component and/or a photonic chip. When one or more optical fibers are located and/or secured in one or more corresponding fiber (Continued)

alignment structures of the apparatus, the one or more apparatus alignment features may also enable passive alignment of the one or more optical fibers relative to the member.

19 Claims, 9 Drawing Sheets

(30)        Foreign Application Priority Data

| | | | |
|---|---|---|---|
| Jun. 28, 2021 | (GB) | ..................................... | 2109290 |
| Aug. 3, 2021 | (GB) | ..................................... | 2111204 |
| Aug. 3, 2021 | (GB) | ..................................... | 2111208 |
| Sep. 6, 2021 | (WO) | ................ | PCT/EP2021/074508 |

(52) U.S. Cl.
CPC ........... *G02B 6/368* (2013.01); *G02B 6/3688* (2013.01); *G02B 6/3837* (2013.01); *G02B 6/4226* (2013.01); *G02B 6/423* (2013.01)

(56)               References Cited

U.S. PATENT DOCUMENTS

| | | | | |
|---|---|---|---|---|
| 5,602,951 | A | | 2/1997 | Shiota et al. |
| 5,742,720 | A | | 4/1998 | Kobayashi et al. |
| 6,062,740 | A | * | 5/2000 | Ohtsuka ............... G02B 6/3865 |
| | | | | 385/83 |
| 6,515,800 | B1 | | 2/2003 | Border et al. |
| 8,615,149 | B2 | | 12/2013 | Kim et al. |
| 9,297,963 | B2 | | 3/2016 | Ohmura et al. |
| 9,983,365 | B2 | | 5/2018 | Childers |
| 10,585,248 | B2 | | 3/2020 | Childers et al. |
| 11,099,329 | B1 | * | 8/2021 | Psaila ............... G02B 19/0014 |
| 2003/0021572 | A1 | | 1/2003 | Steinberg |
| 2004/0042732 | A1 | | 3/2004 | Bruns |
| 2004/0071407 | A1 | | 4/2004 | Vergeest |
| 2005/0123248 | A1 | | 6/2005 | Sakurai et al. |
| 2006/0045421 | A1 | | 3/2006 | Baets et al. |
| 2008/0144999 | A1 | | 6/2008 | Takeda et al. |
| 2011/0033159 | A1 | * | 2/2011 | Kojima ............... G02B 6/4214 |
| | | | | 385/79 |
| 2011/0262083 | A1 | | 10/2011 | Tamura et al. |
| 2012/0033920 | A1 | | 2/2012 | Haley et al. |
| 2012/0099820 | A1 | * | 4/2012 | Rolston ............... G02B 6/4249 |
| | | | | 385/59 |
| 2012/0106900 | A1 | | 5/2012 | Hou et al. |
| 2012/0121218 | A1 | | 5/2012 | Kim et al. |
| 2013/0230273 | A1 | | 9/2013 | Doscher et al. |
| 2014/0177995 | A1 | | 6/2014 | Mohammed et al. |
| 2015/0226922 | A1 | | 8/2015 | Childers |
| 2015/0247982 | A1 | | 9/2015 | Ohmura et al. |
| 2016/0202430 | A1 | * | 7/2016 | de Jong ............... G02B 3/0087 |
| | | | | 385/74 |
| 2016/0282565 | A1 | | 9/2016 | Childers et al. |
| 2019/0361174 | A1 | | 11/2019 | Smith et al. |
| 2020/0326491 | A1 | | 10/2020 | Psaila et al. |
| 2021/0018695 | A1 | | 1/2021 | Ott et al. |

FOREIGN PATENT DOCUMENTS

| | | |
|---|---|---|
| JP | 2007041222 A | 2/2007 |
| JP | 2009258510 A | 11/2009 |
| WO | 2022053434 A1 | 3/2022 |
| WO | 2023275531 A1 | 1/2023 |
| WO | 2023275533 A1 | 1/2023 |

OTHER PUBLICATIONS

PCT International Search Report and Written Opinion issued in PCT/GB2022/051656, dated Oct. 10, 2022; 13 pages.
PCT International Search Report and Written Opinion issued in PCT/GB2022/051657, dated Sep. 20, 2022; 12 pages.
PCT International Search Report and Written Opinion issued in PCT/GB2022/051658, dated Nov. 18, 2022; 13 pages.
U.S. Appl. No. 18/553,361, filed Sep. 29, 2023.
U.S. Appl. No. 18/553,410, filed Sep. 29, 2023.
USPTO Office Action received in U.S. Appl. No. 18/553,410, dated Nov. 20, 2025, 28 pages.
USPTO Non-Final Office Action issued in U.S. Appl. No. 18/553,361, mailed Oct. 20, 2025, 12 pages.

* cited by examiner

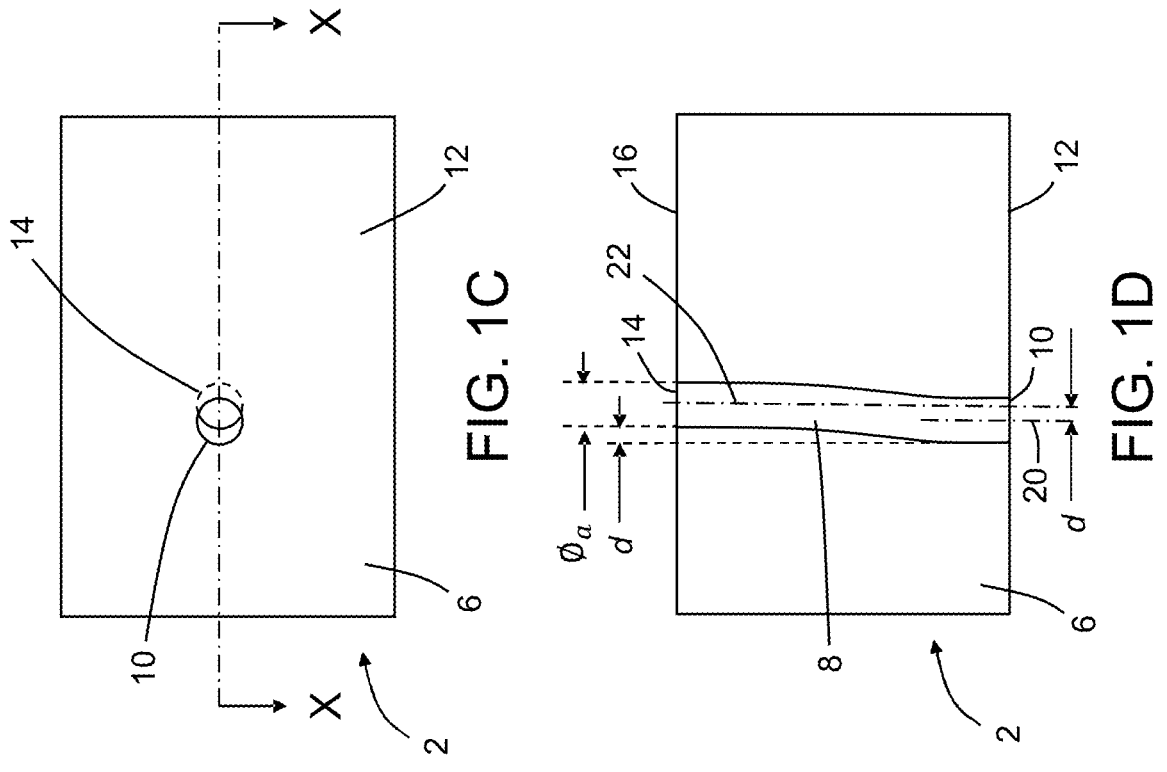
FIG. 1C
FIG. 1D
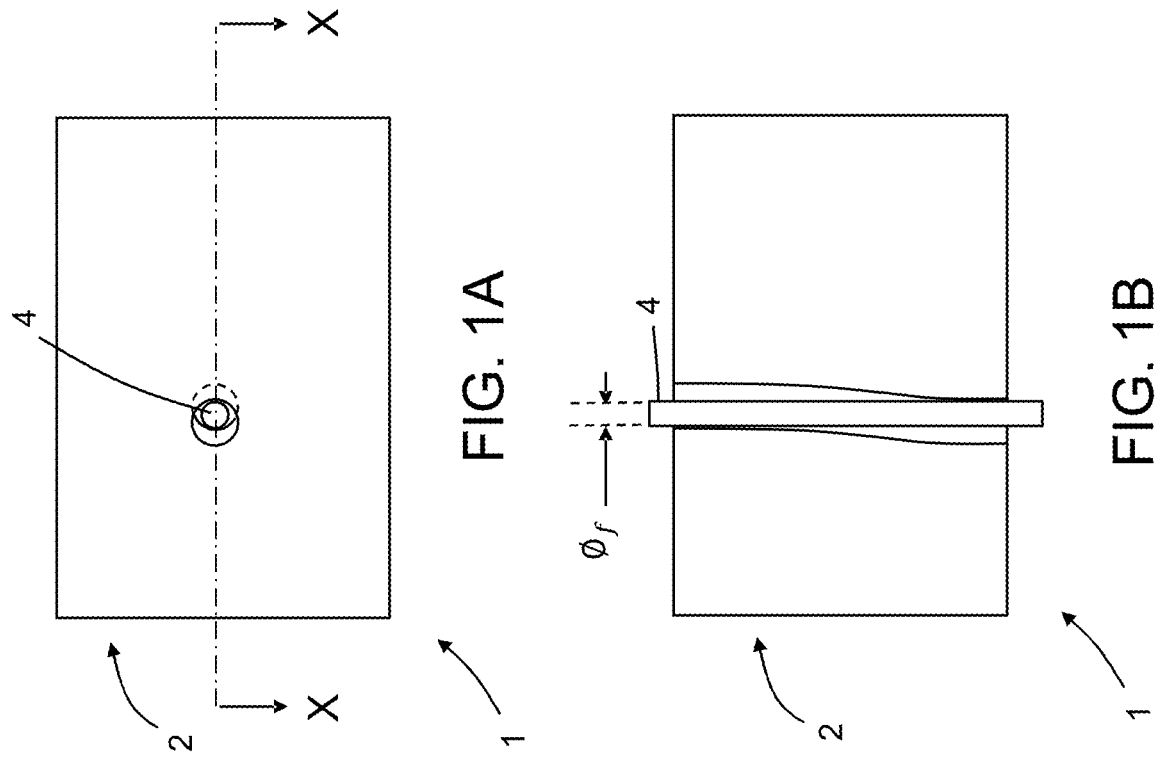
FIG. 1A
FIG. 1B

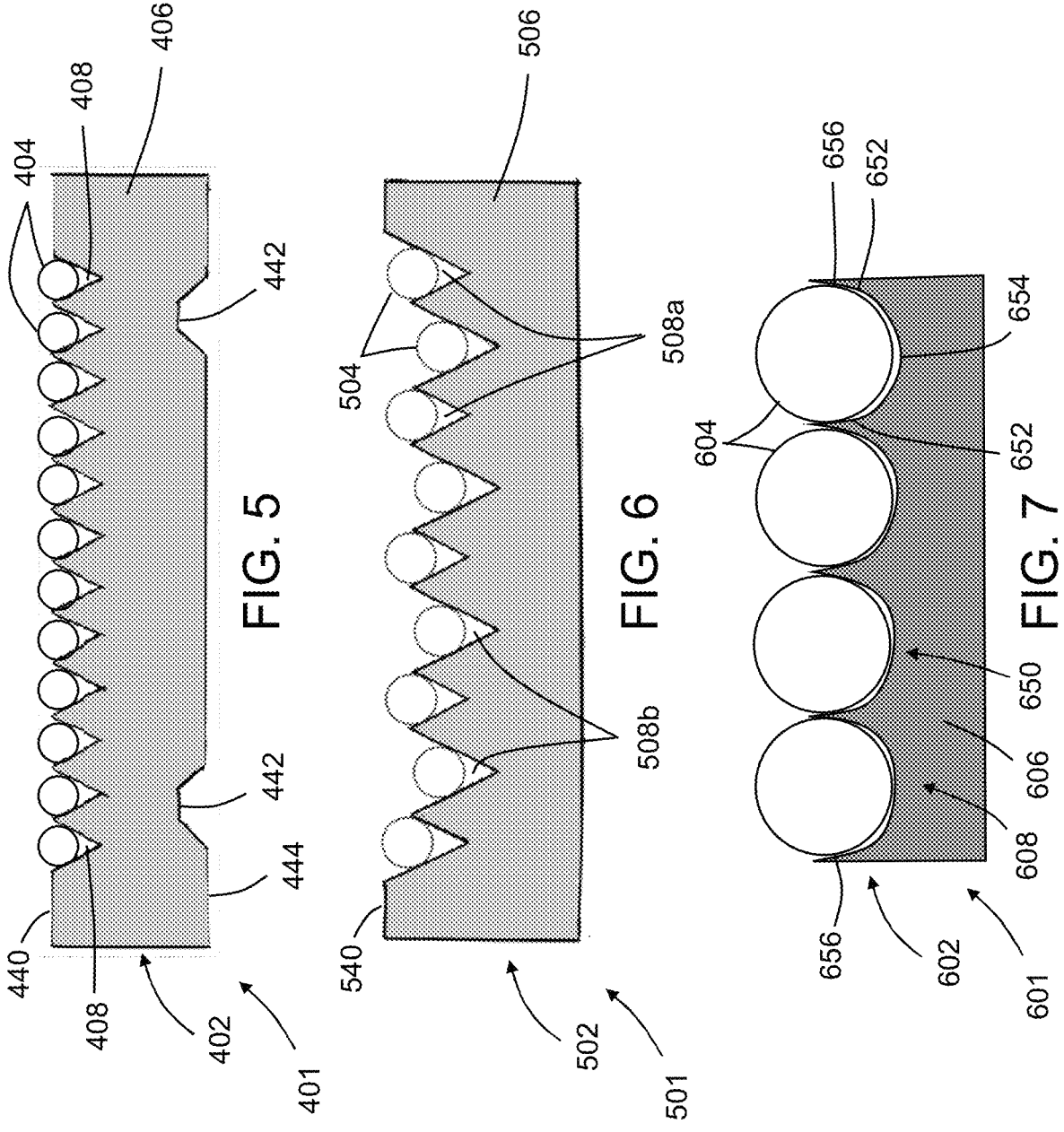

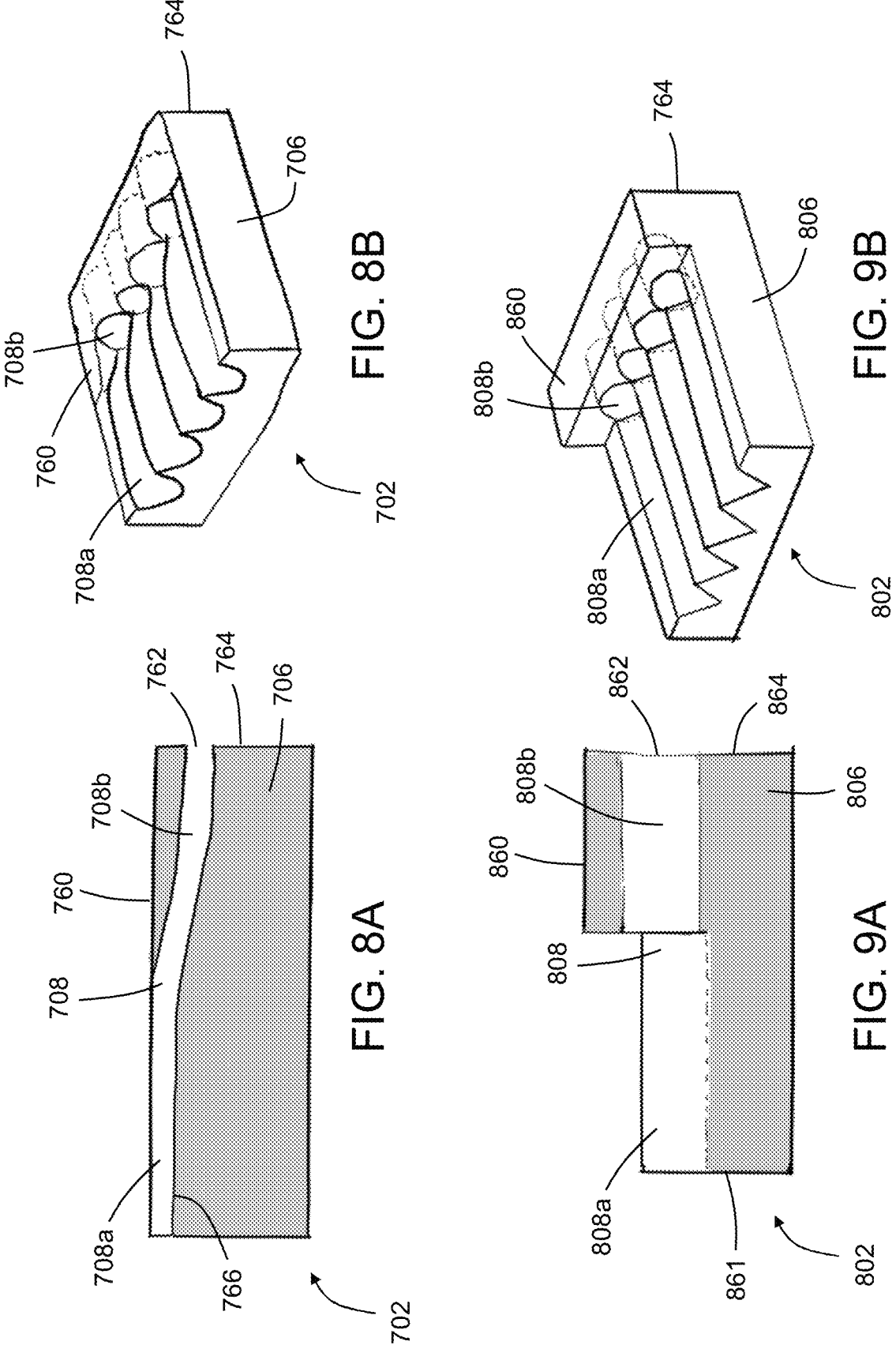

OPTICAL FIBER POSITIONING APPARATUS COMPRISING ONE OR MORE APPARATUS ALIGNMENT FEATURES

CROSS-REFERENCE TO RELATED APPLICATIONS

This Application is a national phase filing under 35 U.S.C. § 371 of International Patent Application Serial No. PCT/GB2022/051657, filed Jun. 28, 2022, and entitled, "OPTICAL FIBER POSITIONING APPARATUS COMPRISING ONE OR MORE APPARATUS ALIGNMENT FEATURES," which claims the benefit of, and priority from, United Kingdom Patent Application Serial No. 2109288.7, filed Jun. 28, 2021; United Kingdom Patent Application Serial No. 2109289.5, filed Jun. 28, 2021; United Kingdom Patent Application Serial No. 2109290.3, filed Jun. 28, 2021; United Kingdom Patent Application Serial No. 2111204.0, filed Aug. 3, 2021; United Kingdom Patent Application Serial No. 2111208.1, filed Aug. 3, 2021; and International PCT Patent Application Serial No. PCT/EP2021/074508, filed Sep. 6, 2021, which application claims the benefit, and priority from, United Kingdom Patent Application Serial No. 2109288.7, filed Jun. 28, 2021; United Kingdom Patent Application Serial No. 2109289.5, filed Jun. 28, 2021; United Kingdom Patent Application Serial No. 2109290.3, filed Jun. 28, 2021; United Kingdom Patent Application Serial No. 2111204.0, filed Aug. 3, 2021; United Kingdom Patent Application Serial No. 2111208.1, filed Aug. 3, 2021, the entire disclosures of which are incorporated herein by reference.

FIELD

The present disclosure relates to an optical fiber positioning apparatus for positioning one or more optical fibers relative to the apparatus for use, in particular though not exclusively, in positioning one or more optical fibers relative to one or more optical components and/or relative to a photonic chip.

BACKGROUND

It is generally desirable to couple light efficiently between one or more optical fibers and one or more optical components for a wide range of fiber optic applications. For example, it is generally desirable to couple light efficiently between a 1D or 2D optical fiber array and a 1D or 2D array of optical components and/or a photonic chip. The one or more optical fibers and the one or more optical components and/or the photonic chip need to be carefully aligned and bonded to one another with sub-micron alignment accuracy, which can be a complex and time-consuming task. Typically, each optical fiber is located and bonded in a corresponding fiber alignment structure such as a V-groove defined in a substrate so as to form an assembly and the assembly is subsequently aligned relative to one or more optical components and/or to a photonic chip. However, the coupling efficiency between each optical fiber and the corresponding optical component and/or the photonic chip may depend inter alia on the accuracy with which each optical fiber is aligned relative to the substrate.

SUMMARY

According to an aspect of the present disclosure there is provided an apparatus for positioning one or more optical fibers relative to the apparatus, the apparatus comprising:

a body comprising a monolithic block of material;

one or more fiber alignment structures formed in the material of the monolithic block, each fiber alignment structure comprising a groove configured to accommodate a corresponding optical fiber; and one or more apparatus alignment features formed in the material of the monolithic block for passive alignment of the apparatus relative to a member such as an optical component and/or the photonic chip which is separate from the apparatus and which has one or more alignment features which are complementary to the one or more apparatus alignment features, wherein the one or more apparatus alignment features are additional to the one or more fiber alignment structures and wherein the one or more apparatus alignment features have a known spatial relationship relative to the one or more fiber alignment structures.

The one or more apparatus alignment features may allow passive alignment of the apparatus relative to a member which is separate from the apparatus such as an optical component and/or a photonic chip. When one or more optical fibers are located and/or secured in one or more corresponding fiber alignment structures of the apparatus, the one or more apparatus alignment features may also allow passive alignment of the one or more optical fibers relative to the member which is separate from the apparatus such as an optical component and/or a photonic chip.

Optionally, formation of the one or more fiber alignment structures comprises using a laser processing procedure to modify the material and removing the modified material, for example by etching.

Optionally, formation of the one or more fiber alignment structures comprises using a laser processing procedure to ablate the material.

Optionally, formation of the one or more apparatus alignment features comprises using a laser processing procedure to modify the material and removing the modified material, for example by etching.

Optionally, formation of the one or more apparatus alignment features comprises using a laser processing procedure to ablate the material.

Optionally, the one or more apparatus alignment features are defined during the same laser processing procedure used to define the one or more fiber alignment structures.

Optionally, the laser processing procedure further comprises holding the body in position using a sample stage and providing relative movement between a laser beam and the sample stage, and wherein the one or more fiber alignment structures and the one or more apparatus alignment features are defined during the same laser processing procedure without removing the body from the sample stage and/or without moving the body relative to the sample stage.

Optionally, each fiber alignment structure is configured to induce one or more bends along the corresponding optical fiber.

Optical fibers generally have a limited degree of flexibility. Consequently, configuring a fiber alignment structure to induce one or more bends along the corresponding optical fiber may result in the corresponding optical fiber being forced into contact with the fiber alignment structure in one or more known regions so that the corresponding optical fiber is located at a more predictable position relative to the corresponding fiber alignment structure in the one or more known regions than is the case for known fiber alignment structures. The location of the corresponding optical fiber at a more predictable position may improve the optical coupling efficiency achievable between the optical fiber and an optical component and/or a photonic chip. The position of the optical fiber in the one or more known regions may be dictated by the manufacturing tolerances of the fiber alignment structure and/or of the optical fiber.

Optionally, each fiber alignment structure extends along a path which is at least partially curved.

Optionally, each fiber alignment structure comprises a passage which extends along the at least partially curved path through the body from a corresponding first opening at a first surface of the body to a corresponding second opening at a second surface of the body.

Optionally, the first and second openings are offset relative to one another.

Optionally, the first opening defines a first axis normal to the first surface, the second opening defines a second axis normal to the second surface, and the first and second axes are parallel, but offset, relative to one another.

Optionally, the passage has a clear aperture defined as a difference between a diameter of the passage and the offset.

Optionally, the clear aperture is less than or equal to a minimum diameter of the corresponding optical fiber.

Optionally, the first and second openings are aligned with one another.

Optionally, the first opening defines a first axis normal to the first surface, the second opening defines a second axis normal to the second surface, and the first and second axes are co-axial.

Optionally, the at least partially curved path defines a maximum deviation from a straight line path.

Optionally, the passage has a clear aperture defined as a difference between a diameter of the passage and the maximum deviation.

Optionally, the clear aperture is less than or equal to a minimum diameter of the corresponding optical fiber.

Optionally, the optical fiber positioning apparatus comprises:

a plurality of fiber alignment features defined in the material of the body in a surface of each fiber alignment structure, wherein each fiber alignment feature has a known spatial relationship relative to the corresponding fiber alignment structure, and wherein the plurality of fiber alignment features define a position of the corresponding optical fiber relative to the corresponding fiber alignment structure.

Optionally, each fiber alignment feature comprises a protrusion which protrudes from a surface of a corresponding fiber alignment structure.

Optionally, each fiber alignment feature comprises a recess which is defined in a surface of a corresponding fiber alignment structure.

Optionally, each fiber alignment structure comprises a passage which extends through the body and two or more of the fiber alignment features are located at different axial positions defined relative to a longitudinal axis along which the corresponding passage extends.

Optical fibers generally have a limited degree of flexibility. Consequently, when an optical fiber is inserted into the passage and two or more of the fiber alignment features are located at different axial positions defined relative to a longitudinal axis along which the corresponding passage extends, one or more bends are induced along the optical fiber and an outer surface of the optical fiber is forced into contact with a sidewall of the passage in the region of at least one of the first and second openings. This may result in the corresponding optical fiber being located at a more predictable position relative to the corresponding passage in the region of at least one of the first and second openings than is the case for known fiber alignment structures. The location of the corresponding optical fiber at a more predictable position may improve the optical coupling efficiency achievable between the optical fiber and an optical component and/or a photonic chip.

Optionally, two or more of the fiber alignment features are located at different circumferential positions defined relative to a longitudinal axis along which the corresponding passage extends.

Optionally, two or more of the fiber alignment features are located at the same axial position but different circumferential positions defined relative to a longitudinal axis along which the corresponding passage extends.

Optionally, two or more of the fiber alignment features are located at the same circumferential position but different axial positions defined relative to a longitudinal axis along which the corresponding passage extends.

Optionally, the plurality of fiber alignment features are formed in the material of the monolithic block.

Optionally, formation of the plurality of fiber alignment features comprises using a laser processing procedure to modify the material and removing the modified material, for example by etching.

Optionally, formation of the plurality of fiber alignment features comprises using a laser processing procedure to ablate the material.

Optionally, the one or more fiber alignment structures and the plurality of fiber alignment features are defined during the same laser processing procedure.

Optionally, the laser processing procedure further comprises holding the body in position using a sample stage and providing relative movement between a laser beam and the sample stage, and wherein the one or more fiber alignment structures and the plurality of fiber alignment features are defined during the same laser processing procedure without removing the body from the sample stage and/or without moving the body relative to the sample stage.

Optionally, the plurality of fiber alignment features are written at a higher resolution and/or a lower laser processing speed than the one or more fiber alignment structures.

Optionally, each fiber alignment structure comprises a passage comprising a first longitudinal section having a first diameter for accommodating a first longitudinal section of the corresponding optical fiber and a second longitudinal section having a second diameter for accommodating a second longitudinal section of the corresponding optical fiber, wherein the first diameter is greater than the second diameter.

Optionally, the first diameter is configured to accommodate a diameter of a buffer layer of the first longitudinal section of the corresponding optical fiber, and the second diameter is configured to accommodate a diameter of a cladding layer of the second longitudinal section of the corresponding optical fiber.

Optionally, the first longitudinal section of the passage of each fiber alignment structure is flared outwardly towards a surface of the body.

Optionally, each fiber alignment structure comprises a passage, wherein the groove and the passage of each fiber alignment structure are arranged end-to-end, and wherein each fiber alignment structure is configured to accommodate a corresponding optical fiber extending along the groove and the corresponding passage.

Optionally, the groove and/or the corresponding passage of each fiber alignment structure extend along a corresponding path which is at least partially curved.

Optionally, the groove of each fiber alignment structure is defined in a first surface of the body and extends from the first surface of the body to an end of the corresponding passage, and the passage of each fiber alignment structure extends from the end of the corresponding groove to a corresponding opening at a second surface of the body.

Optionally, the groove of each fiber alignment structure is defined in the first surface of the body and a bottom of the groove of each fiber alignment structure extends along a corresponding path which is at least partially curved and which extends away from the first surface of the body towards the end of the corresponding passage.

Optionally, the passage of each fiber alignment structure extends along a corresponding path which is at least partially curved and which extends away from the end of the corresponding groove to the corresponding opening at the second surface of the body.

Optionally, the passage of each fiber alignment structure comprises a first longitudinal section having a first diameter for accommodating a first longitudinal section of a corresponding optical fiber and a second longitudinal section having a second diameter for accommodating a second longitudinal section of the corresponding optical fiber, wherein the first diameter is greater than the second diameter.

Optionally, the first diameter is configured to accommodate a diameter of a buffer layer of the first longitudinal section of the corresponding optical fiber, and the second diameter is configured to accommodate a diameter of a cladding layer of the second longitudinal section of the corresponding optical fiber.

Optionally, the first longitudinal section of the passage of each fiber alignment structure is flared outwardly towards a surface of the body.

Optionally, the groove and the corresponding passage of each fiber alignment structure extend along non-parallel paths.

Optionally, the passage of each fiber alignment structure extends along a corresponding path which is configured to direct a corresponding optical fiber along a direction which is angled towards a bottom of the corresponding groove when the optical fiber is inserted into the passage through an opening at one end of the passage and out through an opening at the opposite end of the passage where the passage meets the corresponding groove.

Optionally, the passage of each fiber alignment structure extends along a corresponding path which is angled towards the bottom of the corresponding groove at the opening at the opposite end of the passage where the passage meets the corresponding groove.

Optionally, the groove and/or the corresponding passage of each fiber alignment structure extends along a corresponding path which is at least partially linear.

Optionally, the groove and the corresponding passage of each fiber alignment structure extend along non-parallel linear paths.

Optionally, the apparatus comprises:

a first linear array of fiber alignment structures defined in the material of the body, each fiber alignment structure of the first linear array of fiber alignment structures being configured to accommodate a corresponding optical fiber of a first linear array of optical fibers;

a second linear array of fiber alignment structures defined in the material of the body, each fiber alignment structure of the second linear array of fiber alignment structures being configured to accommodate a corresponding optical fiber of a second linear array of optical fibers, wherein each fiber alignment structure of the first linear array of fiber alignment structures comprises a groove and a corresponding passage, wherein the groove and the corresponding passage are arranged end-to-end, and wherein the passages of the first linear array of fiber alignment structures define a corresponding linear array of openings at a surface of the body, wherein each fiber alignment structure of the second linear array of fiber alignment structures comprises a groove and a corresponding passage, wherein the groove and the corresponding passage are arranged end-to-end, and wherein the passages of the second linear array of fiber alignment structures define a corresponding linear array of openings at the surface of the body, wherein the openings of the first and second linear arrays of fiber alignment structures are offset relative to one another at the surface of the body so as to form a two-dimensional array of openings at the surface of the body and wherein the grooves of the first and second linear arrays of fiber alignment structures are interleaved so as to form an interleaved linear array of grooves.

Optionally, the openings of the first and second linear arrays of fiber alignment structures are offset relative to one another at the surface of the body in two orthogonal directions.

Optionally, the passages of the first linear array of fiber alignment structures are arranged on a first pitch, the passages of the second linear array of fiber alignment structures are arranged on the first pitch, and the grooves of the linear array of interleaved grooves are arranged on a second pitch which is less than the first pitch.

Optionally, the optical fibers of the first linear array of optical fibers are arranged on a first pitch, the optical fibers of the second linear array of optical fibers are arranged on the first pitch, and the grooves of the linear array of interleaved grooves are arranged on a second pitch which is less than the first pitch.

Optionally, the second pitch is equal to, or substantially equal to, half the first pitch.

Optionally, the optical fiber positioning apparatus comprises:

a first linear array of fiber alignment structures in the form of a first linear array of grooves defined in the material of the body; and a second linear array of fiber alignment structures in the form of a second linear array of grooves defined in the material of the body, wherein each groove of the first linear array of grooves is configured to accommodate a corresponding optical fiber at a first depth relative to a surface of the body, and wherein each groove of the second linear array of grooves is configured to accommodate a corresponding optical fiber at a second depth relative to a surface of the body, the second depth being different to the first depth.

Optionally, the grooves of the first linear array of grooves are interleaved with the grooves of the second linear array of grooves.

Optionally, the groove of each fiber alignment structure comprises a V-groove.

Optionally, the groove of each fiber alignment structure extends along a longitudinal axis, each groove has a transverse profile relative to the longitudinal axis, and the transverse profile is at least partially curved.

Optionally, the transverse profile is at least partially concave.

Optionally, the transverse profile includes two sidewalls, and each sidewall is at least partially curved.

Optionally, the transverse profile is configured for contact between the corresponding optical fiber and each of the sidewalls at a corresponding contact position on each sidewall, and each sidewall is curved at the corresponding contact position.

Optionally, the transverse profile includes a bottom portion which connects the two sidewalls or an apex at which the two sidewalls meet, and a gradient of each sidewall decreases from a top of the sidewall towards the bottom portion or the apex of the transverse profile.

Optionally, a gradient of each sidewall at the contact position is steeper than a gradient of the sidewall at a position between the contact position and the bottom portion or the apex of the transverse profile.

Optionally, the transverse profile is complementary to an outer surface of the corresponding optical fiber.

Optionally, the groove of each fiber alignment structure comprises a U-groove.

According to an aspect of the present disclosure there is provided an assembly comprising the apparatus as described above and one or more optical fibers, wherein each fiber alignment structure accommodates a corresponding one of the optical fibers.

According to an aspect of the present disclosure there is provided a method of forming any of the optical fiber positioning apparatus described above, the method comprising:

laser processing the body comprising the material so as to define the one or more fiber alignment structures in the material.

Optionally, the body comprises a monolithic block of the material and the one or more fiber alignment structures are defined in the material of the monolithic block.

Optionally, laser processing the body comprising material so as to define one or more fiber alignment structures in the material comprises laser modification of the material.

Optionally, the method comprises removal of the laser modified material, for example by etching.

Optionally, laser processing the body comprising material so as to define one or more fiber alignment structures in the material comprises laser ablation of the material.

Optionally, the method comprises laser processing the body so as to define one or more apparatus alignment features in the material of the monolithic block for passive alignment of the optical fiber positioning apparatus relative to a member which is separate from the optical fiber positioning apparatus and which has one or more alignment features which are complementary to the one or more apparatus alignment features, wherein the one or more apparatus alignment features are additional to the one or more fiber alignment structures and wherein the one or more apparatus alignment features have a known spatial relationship relative to the one or more fiber alignment structures.

Optionally, the method comprises laser processing the body so as to define the one or more apparatus alignment features during the same laser processing procedure used to define the one or more fiber alignment structures.

Optionally, the laser processing procedure further comprises holding the body in position using a sample stage and providing relative movement between a laser beam and the sample stage, and wherein the one or more fiber alignment structures and the one or more apparatus alignment features are defined during the same laser processing procedure without removing the body from the sample stage and/or without moving the body relative to the sample stage.

It should be understood that any one or more of the features of any one of the foregoing aspects of the present disclosure may be combined with any one or more of the features of any of the other foregoing aspects of the present disclosure.

BRIEF DESCRIPTION OF THE DRAWINGS

An optical fiber positioning apparatus for positioning one or more optical fibers relative to the optical fiber positioning apparatus and a method of forming such an optical fiber positioning apparatus will now be described by way of non-limiting example only with reference to the accompanying drawings of which:

FIG. 1A is a schematic end view of a first assembly including a first optical fiber positioning apparatus and an optical fiber;

FIG. 1B is a cross-section on XX of the first assembly of FIG. 1A;

FIG. 1C is a schematic end view of the first optical fiber positioning apparatus of FIG. 1A;

FIG. 1D is a cross-section on XX of the first optical fiber positioning apparatus of FIG. 1C;

FIG. 5 is a schematic end view of a fifth assembly including a fifth optical fiber positioning apparatus and a plurality of optical fibers;

FIG. 6 is a schematic end view of a sixth assembly including a sixth optical fiber positioning apparatus and a plurality of optical fibers;

FIG. 7 is a schematic end view of a seventh assembly including a seventh optical fiber positioning apparatus and a plurality of optical fibers;

FIG. 8A is a schematic longitudinal cross-section of an eighth optical fiber positioning apparatus;

FIG. 8B is a schematic perspective view of the eighth optical fiber positioning apparatus of FIG. 8A;

FIG. 9A is a schematic longitudinal cross-section of an ninth optical fiber positioning apparatus;

FIG. 9B is a schematic perspective view of the ninth optical fiber positioning apparatus of FIG. 9A;

DETAILED DESCRIPTION OF THE DRAWINGS

Figures 2A, 2B:
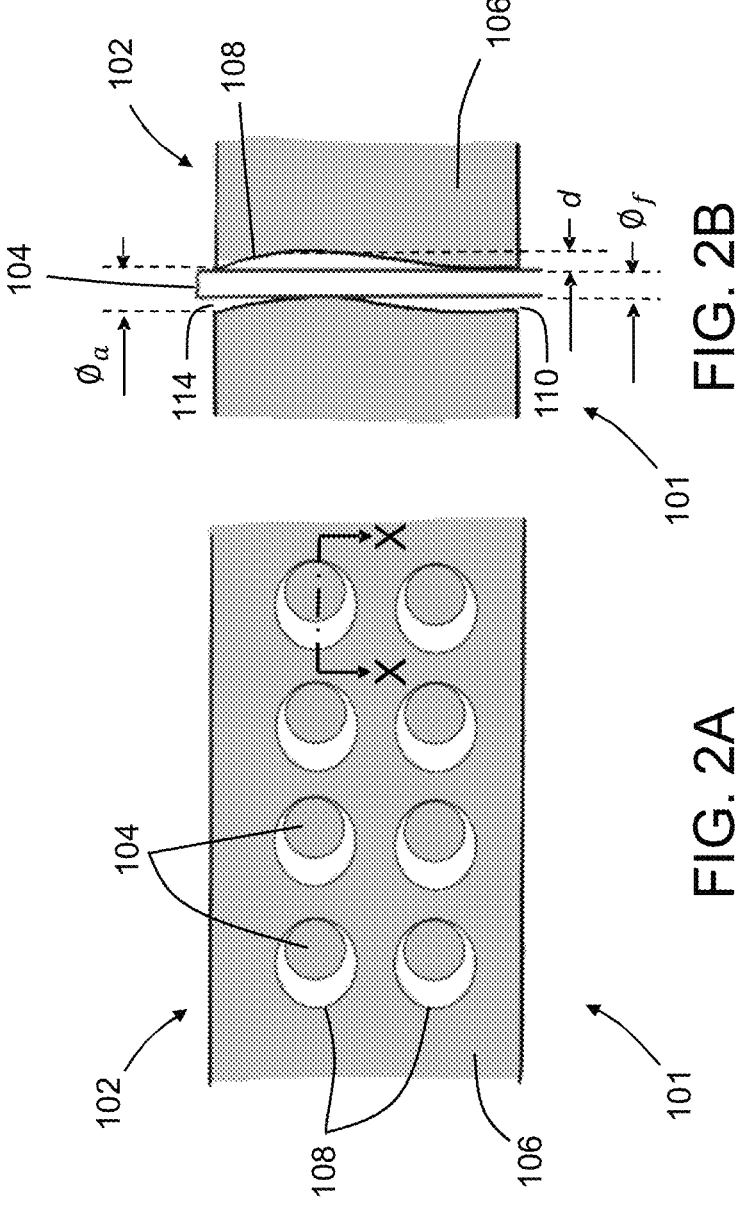
FIG. 2A is a schematic end view of a second assembly including a second optical fiber positioning apparatus and a plurality of optical fibers.
FIG. 2B is a cross-section on XX of the second assembly of FIG. 2A.

Referring initially to FIGS. 1A and 1B there is shown a first assembly generally designated 1 which includes a first optical fiber positioning apparatus 2 and an optical fiber 4, wherein the apparatus 2 is configured for positioning the optical fiber 4 relative to the apparatus 2.

As shown in FIGS. 1C and 1D, the apparatus 2 includes a body 6 formed from a glass material, and a fiber alignment structure in the form of a passage 8 defined through the glass material of the body 6, wherein the passage is configured to accommodate the optical fiber 4, allowing for the tolerances associated with the manufacturing of the optical fiber 4. The passage 8 extends along a path which is at least partially curved and which extends from a first opening 10 at a first surface 12 of the body 6 to a second opening 14 at a second surface 16 of the body 6. As shown most clearly in FIG. 1D, the first and second openings 10, 14 are offset relative to one another by a distance d. Specifically, the first opening 10 defines a first axis 20 normal to the first surface 12, the second opening 14 defines a second axis 22 normal to the second surface 16, and the first and second axes 20, 22 are parallel, but offset, relative to one another by the distance d. Moreover, a difference between a diameter $\varnothing_a$ of the passage 8 and the offset d is less than or equal to a minimum diameter $\varnothing_f$ of the corresponding optical fiber 4. In other words, the passage 8 defines a "clear aperture" which is less than or equal to the minimum diameter $\varnothing_f$ of the corresponding optical fiber 4. Consequently, as the optical fiber 4 is inserted into the passage 8, an outer surface of the optical fiber 4 is forced into contact with a wall of the passage 8 causing the optical fiber 4 to flex to a limited degree and inducing one or more bends in the optical fiber 4 until the optical fiber 4 extends through the passage 8 with the outer surface of the optical fiber 4 in contact with the wall of the passage 8 in regions adjacent to the openings 10, 14. In effect, this results in the optical fiber 4 being positioned at a more predictable position relative to each of the openings 10, 14. Consequently, the apparatus 2 may facilitate more accurate positioning of the optical fiber 4 relative to the apparatus 2. This may be advantageous when positioning the assembly 1 relative to an optical component and/or a photonic chip which are separate from the assembly 1 for efficient optical coupling between the optical fiber 4 on the one hand and the optical component and/or the photonic chip on the other hand. Typically, the optical fiber 4 may have a minimum diameter $\varnothing_f$ of around 125 µm, the curved portion of the passage 8 may be defined over a longitudinal distance in the range of a few tens of µm up to 1 mm e.g. of the order of 100 µm, and the offset d may be in the range of 1-10 µm, 4 to 6 µm, or substantially equal to 5 µm. This may result in positional accuracies of the optical fiber 4 in the regions adjacent to the openings 10, 14 of the order of ±½ µm or better.

As will be described in more detail below, the body 6 may comprise a monolithic block of the material and the passage 8 may be formed in the material of the monolithic block. In particular, the passage 8 may be formed by using a laser processing procedure to modify the material of the body 6 and by removing the modified material of the body 6, for example by etching. Additionally or alternatively, the passage 8 may be formed by using a laser processing procedure to ablate the material of the body 6.

Although the first assembly 1 of FIGS. 1A and 1B includes a single optical fiber 4 and the apparatus 2 of FIGS. 1C and 1D includes a single passage 8 for accommodating the optical fiber 4, it should be understood that in a variant of the first assembly 1 of FIGS. 1A and 1B and the apparatus 2 of FIGS. 1C and 1D, the apparatus may include a plurality of passages like the passage 8, wherein each passage is configured to accommodate a corresponding optical fiber.

Referring to FIGS. 2A and 2B there is shown a second assembly generally designated 101 which includes a second optical fiber positioning apparatus 102 and a plurality of optical fibers 104, wherein the apparatus 102 is configured for positioning the optical fibers 104 relative to the apparatus 102. The apparatus 102 includes a body 106 formed from a glass material, and a plurality of fiber alignment structures in the form of a plurality of passages 108 defined through the glass material of the body 106, wherein each passage 108 is configured to accommodate a corresponding optical fiber 104. Each passage 108 extends along a corresponding path which is at least partially curved and which extends from a corresponding first opening 110 at a first surface 112 of the body 106 to a corresponding second opening 114 at a second surface 116 of the body 106. As shown most clearly in FIG. 2B, the first and second openings 110, 114 of each passage 108 are aligned with one another.

As shown in FIG. 2B, each at least partially curved path defines a maximum deviation d from a straight line path. A difference between a diameter $\varnothing_a$ of each passage 108 and the maximum deviation d is less than or equal to a minimum diameter $\varnothing_f$ of the corresponding optical fiber 104. In other words, each passage 108 defines a "clear aperture" which is less than or equal to the minimum diameter $\varnothing_f$ of the corresponding optical fiber 104. Consequently, as the optical fiber 104 is inserted into the passage 108, an outer surface of each optical fiber 104 is forced into contact with a wall of the corresponding passage 108 causing each optical fiber 104 to flex to a limited degree and inducing one or more bends in each optical fiber 104 until each optical fiber 104 extends through the corresponding passage 108 with the outer surface of each optical fiber 104 in contact with the wall of the corresponding passage 108 in regions adjacent to the corresponding openings 110, 114. In effect, this results in each optical fiber 104 being positioned at a more predictable position relative to each of the corresponding openings 110, 114. Consequently, the apparatus 102 may facilitate more accurate positioning of the plurality of optical fibers 104 relative to the apparatus 102. This may be advantageous when positioning the assembly 101 relative to an optical component and/or a photonic chip which are separate from the assembly 101 for efficient optical coupling between each optical fiber 104 of the plurality of optical fibers 104 on the one hand and the optical component and/or the photonic chip on the other hand. Typically, the optical fiber 104 may have a minimum diameter $\varnothing_f$ of around 125 µm, the curved portion of the passage 108 may be defined over a longitudinal distance in the range of a few tens of µm up to 1 mm e.g. of the order of 100 µm, and the maximum deviation d may be in the range of 1-10 µm, 4 to 6 µm, or substantially equal to 5 µm. This may result in positional accuracies of the optical fiber 104 in the regions adjacent to the openings 110, 114 of the order of ±% m or better.

As will be described in more detail below, the body 106 may comprise a monolithic block of the material and each of the passages 108 may be formed in the material of the monolithic block. In particular, each of the passages 108 may be formed by using a laser processing procedure to modify the material of the body 106 and by removing the modified material of the body 106, for example by etching. Additionally or alternatively, each of the passages 108 may be formed by using a laser processing procedure to ablate the material of the body 106.

Although the second assembly 101 of FIGS. 2A and 2B includes a plurality of optical fibers 104 and the apparatus 102 of FIGS. 2A and 2B includes a plurality of passages 108, wherein each passage 108 is configured for accommodating a corresponding optical fiber 104, it should be understood that in a variant of the second assembly 101 of FIGS. 2A and 2B, the assembly may include a single optical fiber and the apparatus may include a single passage like any one of the passages 108, wherein the single passage is configured to accommodate the single optical fiber.

Figure 3B:
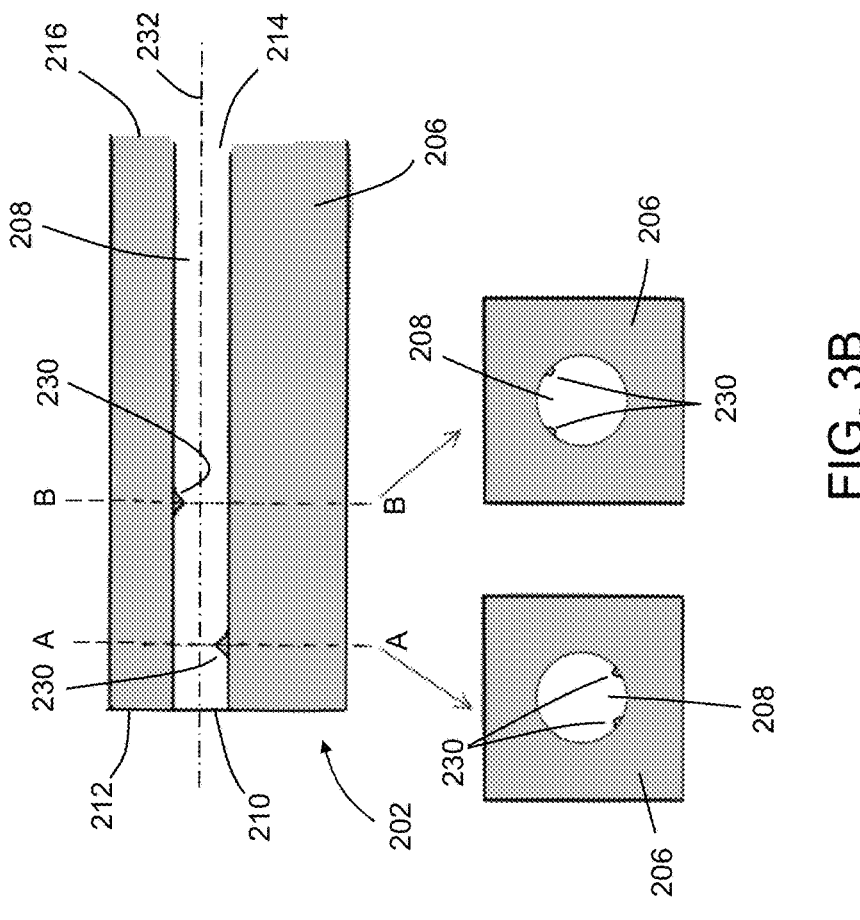
FIG. 3B shows a schematic longitudinal cross-section of the third optical fiber positioning apparatus of FIG. 3A and transverse cross-sections on AA and BB of the third optical fiber positioning apparatus of FIG. 3A.
Figure 3A:
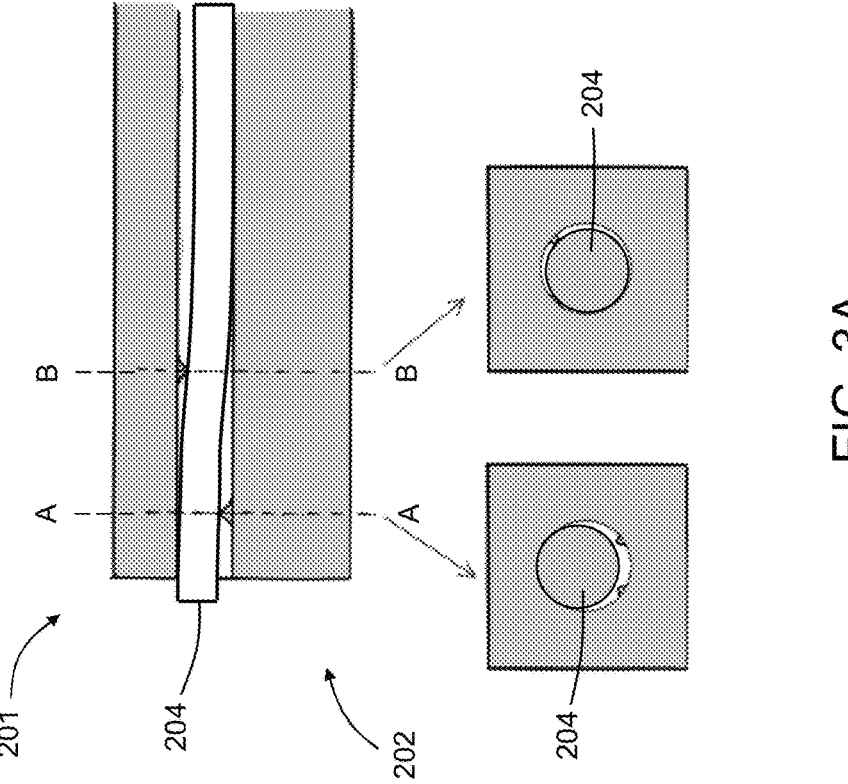
FIG. 3A shows a schematic longitudinal cross-section of a third assembly including a third optical fiber positioning apparatus and an optical fiber and transverse cross-sections on AA and BB of the third assembly.

Referring to FIGS. 3A and 3B there is shown a third assembly generally designated 201 which includes a third optical fiber positioning apparatus 202 and an optical fiber 204, wherein the apparatus 202 is configured for positioning the optical fiber 204 relative to the apparatus 202. The apparatus 202 includes a body 206 formed from a glass material, and a fiber alignment structure in the form of a passage 208 defined through the glass material of the body 206, wherein the passage 208 is configured to accommodate the optical fiber 204 allowing for the tolerances associated with the manufacturing of the optical fiber 204. The passage 208 extends from a corresponding first opening 210 at a first surface 212 of the body 206 to a corresponding second opening 214 at a second surface 216 of the body 206.

A plurality of fiber alignment features in the form of a plurality of protrusions 230 are defined in the material of the body 206 in a surface or sidewall of the passage 208. As will be appreciated from the following description, the protrusions 230 have a known spatial relationship relative to the passage 208 so that the protrusions 230 together define a position of the optical fiber 204 relative to the passage 208. Specifically, two of the protrusions 230 are located at a first axial position defined relative to a longitudinal axis 232 along which the passage 208 extends as shown in the transverse cross-sections on AA in FIGS. 3A and 3B and two of the protrusions 230 are located at a second axial position defined relative to the longitudinal axis 232 as shown in the transverse cross-sections on BB in FIGS. 3A and 3B. Moreover, each of the protrusions 230 at the first axial position are located at different circumferential positions defined relative to the longitudinal axis 232 as shown in the transverse cross-sections on AA in FIGS. 3A and 3B and each of the protrusions 230 at the second axial position are located at different circumferential positions defined relative to the longitudinal axis 232 as shown in the transverse cross-sections on BB in FIGS. 3A and 3B. One of ordinary skill in the art will understand that the optical fiber 204 has a limited degree of flexibility. Moreover, as a consequence of the arrangement of the protrusions 230, the outer surface of the optical fiber 204 engages a wall of the passage 208 in regions adjacent to the openings 210, 214 as shown in FIG. 3A such that the optical fiber 204 is positioned at a more predictable position relative to each of the openings 210, 214 which depends on the tolerances associated with the manufacturing of the passage 208 and of the optical fiber 204. Consequently, the apparatus 202 may facilitate more accurate positioning of the optical fiber 204 relative to the apparatus 202. This may be advantageous when positioning the assembly 201 relative to an optical component and/or a photonic chip which are separate from the assembly 201 for efficient optical coupling between the optical fiber 204 on the one hand and the optical component and/or the photonic chip on the other hand. Typically, the optical fiber 104 may have a minimum diameter $\emptyset_f$ of around 125 µm, and each protrusion 230 may protrude by a distance from a sidewall of the passage 208 by a distance in the range of 1-10 µm, for example 1-2 µm. Each protrusion may have a diameter of the order of 5-10 µm. The longitudinal separation between the different sets of protrusions 230 on the transverse cross-sections on AA and BB may be in the range of a few tens of µm up to 1 mm e.g. of the order of 100 µm. This may result in positional accuracies of the optical fiber 204 in the regions adjacent to the openings 210, 214 of the order of ±½ µm or better.

As will be described in more detail below, the body 206 may comprise a monolithic block of the material and the passage 208 and the protrusions 230 may be formed in the material of the monolithic block. In particular, the passage 208 and the protrusions 230 may be formed by using a laser processing procedure to modify the material of the body 206 and by removing the modified material of the body 206, for example by etching. Additionally or alternatively, the passage 208 and the protrusions 230 may be formed by using a laser processing procedure to ablate of the material of the body 206.

Although the third assembly 201 of FIGS. 3A and 3B includes a single optical fiber 204 and the apparatus 202 of FIGS. 3A and 3B includes a single passage 208 for accommodating the optical fiber 204, it should be understood that in a variant of the third assembly 201 of FIGS. 3A and 3B and the apparatus 202 of FIGS. 3A and 3B, the apparatus may include a plurality of passages like the passage 208, wherein each passage is configured to accommodate a corresponding optical fiber.

Figure 4:
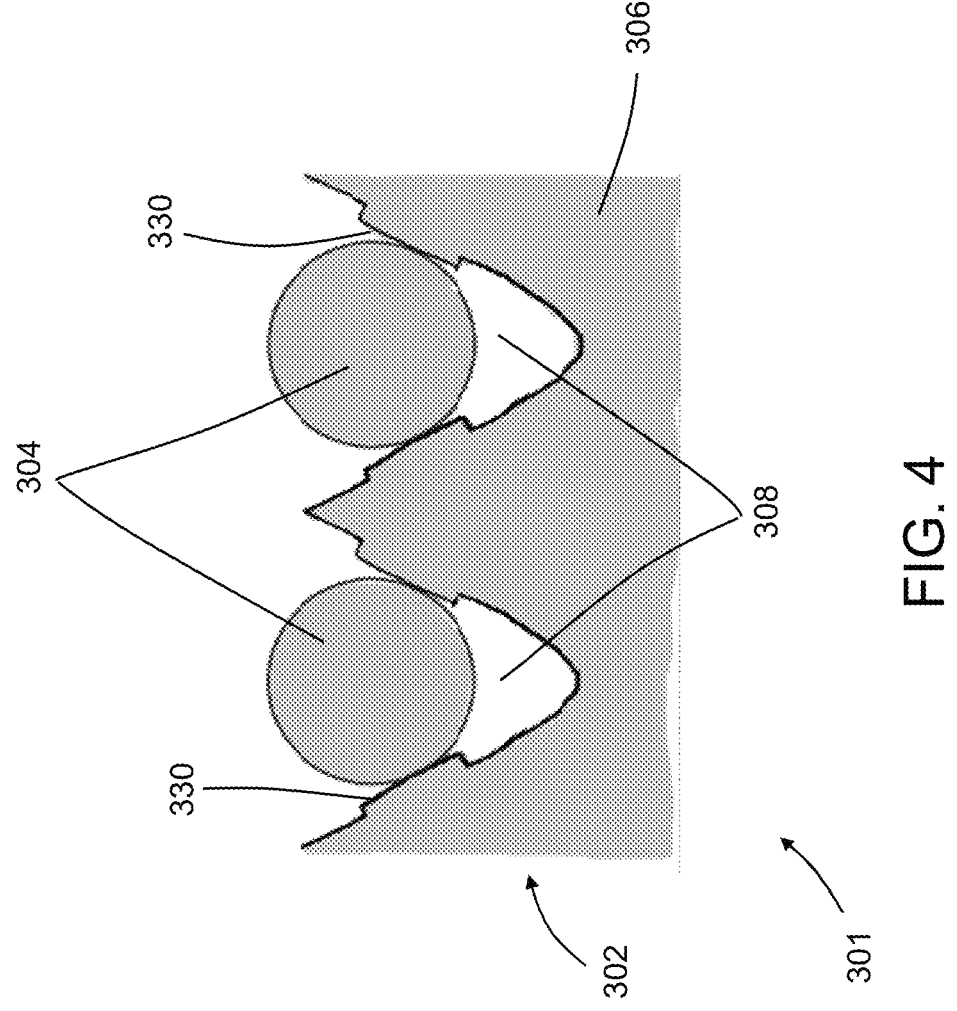
FIG. 4 is a schematic end view of a fourth assembly including a fourth optical fiber positioning apparatus and a plurality of optical fibers.

Referring to FIG. 4 there is shown a fourth assembly generally designated 301 which includes a fourth optical fiber positioning apparatus 302 and a plurality of optical fibers 304, wherein the apparatus 302 is configured for positioning the plurality of optical fibers 304 relative to the apparatus 302. The apparatus 302 includes a body 306 formed from a glass material, and a plurality of fiber alignment structures in the form of a plurality of V-grooves 308 defined in the glass material of the body 306, wherein each V-groove 308 is configured to accommodate a corresponding optical fiber 304. In addition, a plurality of fiber alignment features in the form of a plurality of protrusions 330 are defined in the material of the body 306, wherein each protrusion 330 protrudes from a surface of the corresponding V-groove 308. The protrusions 330 have a known spatial relationship relative to the corresponding V-groove 308 so that the protrusions 330 together define a position of the corresponding optical fiber 304 relative to the corresponding V-groove 308.

As will be described in more detail below, the body 306 may comprise a monolithic block of the material and the V-grooves 308 and the protrusions 330 may be formed in the material of the monolithic block. In particular, the V-grooves 308 and the protrusions 330 may be formed by using a laser processing procedure to modify the material of the body 306 and by removing the modified material of the body 306, for example by etching. Additionally or alternatively, the V-grooves 308 and the protrusions 330 may be formed by using a laser processing procedure to ablate the material of the body 306. The plurality of protrusions 330 are written at a higher resolution and/or a lower laser processing speed than the other surface regions of the V-grooves 308. For example, the plurality of protrusions 330 may be written by exposing adjacent volumes of the material of the body 306 to laser radiation on a pitch of ½-1 µm whereas the other surface regions of the V-grooves 308 may be written by exposing adjacent volumes of the material of the body 306 to laser radiation on a pitch of 10-20 µm. This may result in an enhancement in laser writing speed in the other surface regions of the V-grooves 308 by a factor in the range of 10-20. This results in the geometry and/or dimensions of the protrusions 330 having an improved accuracy relative to the other surface regions of the V-grooves 308. This may allow positioning of the optical fibers 304 relative to the apparatus 302 to a predetermined accuracy for a reduced processing time or an improved positioning accuracy of the optical fibers 304 relative to the apparatus 302 for a predetermined processing time. This may be advantageous when positioning the assembly 301 relative to an optical component and/or a photonic chip which are separate from the assembly 301 for efficient optical coupling between the optical fibers 304 on the one hand and the optical component and/or the photonic chip on the other hand.

Although the fourth assembly 301 of FIG. 4 includes a plurality of optical fibers 304 and the apparatus 302 of FIG. 4 includes a plurality of V-grooves 308, wherein each V-groove 308 is configured for accommodating a corresponding optical fiber 304, it should be understood that in a variant of the fourth assembly 301 of FIG. 4, the assembly may include a single optical fiber and the apparatus may include a single V-groove like any one of the V-grooves 308, wherein the single V-groove is configured to accommodate the single optical fiber.

Referring to FIG. 5 there is shown a fifth assembly generally designated 401 which includes a fifth optical fiber positioning apparatus 402 and a plurality of optical fibers 404, wherein the apparatus 402 is configured for positioning the plurality of optical fibers 404 relative to the apparatus 402. The apparatus 402 includes a body 406 formed from a glass material, and a plurality of fiber alignment structures in the form of a plurality of V-grooves 408 defined in a first surface 440 of the glass material of the body 406, wherein each V-groove 408 is configured to accommodate a corresponding optical fiber 404.

The apparatus 402 further includes a plurality of apparatus alignment features 442 formed in a second surface 444 of the material of the body 406 for passive alignment of the apparatus 402 relative to a member (not shown) such as an optical component and/or the photonic chip which is separate from the apparatus 402 and which has alignment features which are complementary to the apparatus alignment features 442, wherein the apparatus alignment features 442 are additional to the V-grooves 408 and wherein the one or more apparatus alignment features 442 have a known spatial relationship relative to the V-grooves 408.

As will be described in more detail below, the body 406 comprises a monolithic block of the material and the V-grooves 408 and the apparatus alignment features 442 are formed in the material of the monolithic block. In particular, the V-grooves 408 and the apparatus alignment features 442 may be formed by using a laser processing procedure to modify the material of the body 406 and by removing the modified material of the body 406, for example by etching. Additionally or alternatively, the V-grooves 408 and the apparatus alignment features 442 may be formed by using a laser processing procedure to ablate the material of the body 406. The apparatus alignment features 442 may be defined during the same laser processing procedure used to form the V-grooves 408. The laser processing procedure may further comprise holding the body 406 in position using a sample stage and providing relative movement between a laser beam and the sample stage, wherein the V-grooves 408 and the apparatus alignment features 442 are defined during the same laser processing procedure without removing the body 406 from the sample stage and/or without moving the body 406 relative to the sample stage. Such a laser processing procedure may improve the accuracy of positioning of the V-grooves 408 relative to the apparatus alignment features 442 for improved passive alignment accuracy between the optical fibers 404 located in the V-grooves 408 and a separate member such as a separate optical component and/or a separate photonic chip which has alignment features which are complementary to the apparatus alignment features 442 for improving an optical coupling efficiency between the optical fibers 404 on the one hand and the optical component and/or the photonic chip on the other hand. Typical positional accuracies of any one of the optical fibers 404 with respect to a lower surface of the apparatus 402 may be of the order of ±½ µm or better.

Although the fifth assembly 401 of FIG. 5 includes a plurality of optical fibers 404 and the apparatus 402 of FIG. 5 includes a plurality of V-grooves 408, wherein each V-groove 408 is configured for accommodating a corresponding optical fiber 404, it should be understood that in a variant of the fifth assembly 401 of FIG. 5, the assembly may include a single optical fiber and the apparatus may include a single V-groove like any one of the V-grooves 408, wherein the single V-groove is configured to accommodate the single optical fiber.

Referring to FIG. 6 there is shown a sixth assembly generally designated 501 which includes a sixth optical fiber positioning apparatus 502 and a plurality of optical fibers 504, wherein the apparatus 502 is configured for positioning the plurality of optical fibers 504 relative to the apparatus 502. The apparatus 502 includes a body 506 formed from a glass material, and a first plurality of fiber alignment structures in the form of a first linear array of V-grooves 508a defined in a surface 540 of the glass material of the body 506 and a second plurality of fiber alignment structures in the form of a second linear array of V-grooves 508b defined in the surface 540 of the glass material of the body 506. The V-grooves 508a of the first linear array of V-grooves 508a are interleaved with the V-grooves 508b of the second linear array of V-grooves 508b. Each V-groove 508a of the first linear array of grooves 508a is configured to accommodate a corresponding optical fiber 504 at a first depth relative to the surface 540 of the body 506 and each V-groove 508b of the second linear array of grooves 508b is configured to accommodate a corresponding optical fiber 504 at a second depth relative to the surface 540 of the body 506.

As will be described in more detail below, the body 506 comprises a monolithic block of the material and the first and second linear arrays of V-grooves 508a, 508b may be formed in the material of the monolithic block. In particular, the first and second linear arrays of V-grooves 508a, 508b may be formed by using a laser processing procedure to modify the material of the body 506 and by removing the modified material of the body 506, for example by etching. Additionally or alternatively, the first and second linear arrays of V-grooves 508a, 508b may be formed by using a laser processing procedure to ablate the material of the body 506. The laser processing procedure may further comprise holding the body 506 in position using a sample stage and providing relative movement between a laser beam and the sample stage, wherein the first and second linear arrays of V-grooves 508a, 508b are defined during the same laser processing procedure without removing the body 506 from the sample stage and/or without moving the body 506 relative to the sample stage. Such a laser processing procedure may improve the accuracy of positioning of the first and second linear arrays of V-grooves 508*a*, 508*b* for improved alignment accuracy between the optical fibers 504 and an optical component and/or a separate photonic chip for improving an optical coupling efficiency between the optical fibers 504 on the one hand and the optical component and/or the photonic chip on the other hand.

Referring to FIG. 7 there is shown a seventh assembly generally designated 601 which includes a seventh optical fiber positioning apparatus 602 and a plurality of optical fibers 604, wherein the apparatus 602 is configured for positioning the plurality of optical fibers 604 relative to the apparatus 602. The apparatus 602 includes a body 606 formed from a glass material, and a plurality of fiber alignment structures in the form of an array of U-grooves 608 defined in the glass material of the body 606. Each U-groove 608 is configured to accommodate a corresponding optical fiber 604. Each U-groove 608 extends along a longitudinal axis, and each U-groove 608 has a transverse profile generally designated 650 relative to the longitudinal axis, wherein the transverse profile 650 is at least partially curved. Specifically, the transverse profile 650 is at least partially concave and/or is complementary to an outer surface of the corresponding optical fiber. More specifically, the transverse profile 650 includes two sidewalls 652, wherein each sidewall 652 is at least partially curved. The transverse profile includes a bottom portion 654 which connects the two sidewalls 652. A gradient of each sidewall 652 decreases from a top of the sidewall 652 towards the bottom portion 654 of the transverse profile 650. Moreover, the transverse profile 650 is configured for contact between the corresponding optical fiber 604 and each of the sidewalls 652 at a corresponding contact position 656 on each sidewall 652, and wherein each sidewall 652 is curved at the corresponding contact position 656. A gradient of each sidewall 652 at the contact position 656 is steeper than a gradient of the sidewall 652 at a position between the contact position 656 and the bottom portion 654 of the transverse profile 650. Such a U-groove 608 may allow the plurality of optical fibers 604 to be aligned in a more tightly-pitched array than would be possible using an array of V-grooves. Such a U-groove 608 may also provide better adhesive contact between the body 606 and an outer surface of the corresponding optical fiber 604. Such a U-groove 608 may also provide enhanced positional accuracy of the optical fiber 604 relative to the body 606.

As will be described in more detail below, the body 606 comprises a monolithic block of the material and the array of U-grooves 608 may be formed in the material of the monolithic block. In particular, the array of U-grooves 608 may be formed by using a laser processing procedure to modify the material of the body 606 and by removing the modified material of the body 606, for example by etching. Additionally or alternatively, the array of U-grooves 608 may be formed by using a laser processing procedure to ablate the material of the body 606.

Although the seventh assembly 601 of FIG. 7 includes a plurality of optical fibers 604 and the apparatus 602 of FIG. 7 includes a plurality of U-grooves 608, wherein each U-groove 608 is configured for accommodating a corresponding optical fiber 604, it should be understood that in a variant of the seventh assembly 601 of FIG. 7, the assembly may include a single optical fiber and the apparatus may include a single U-groove like any one of the U-grooves 608, wherein the single U-groove is configured to accommodate the single optical fiber.

Referring to FIGS. 8A and 8B there is shown an eighth optical fiber positioning apparatus 702 for an eighth assembly, wherein the apparatus 702 is configured for positioning a plurality of optical fibers relative to the apparatus 702. The apparatus 702 includes a body 706 formed from a glass material, and a plurality of fiber alignment structures 708, wherein each fiber alignment structure 708 comprises a groove 708*a* and a corresponding passage 708*b*, wherein the groove 708*a* and the corresponding passage 708*b* are arranged end-to-end, and wherein each fiber alignment structure 708 is configured to accommodate a corresponding optical fiber extending along the groove 708*a* and the corresponding passage 708*b*.

The groove 708*a* of each fiber alignment structure 708 is defined in an upper surface 760 of the body 706 and extends from the upper surface 760 of the body 706 to an end of the corresponding passage 708*b*. Moreover, the groove 708*a* of each fiber alignment structure 708 extends along a path which is at least partially curved. More specifically, the groove 708*a* of each fiber alignment structure 708 is defined in the first surface 760 of the body 706 and a bottom 766 of the groove 708*a* of each fiber alignment structure 708 extends along a path which is at least partially curved and which extends away from the upper surface 760 of the body 706 to the end of the corresponding passage 708*b*. The groove 708*a* of each fiber alignment structure 708 comprises a U-groove like the U-grooves described with reference to FIG. 7.

The passage 708*b* of each fiber alignment structure 708 extends from the end of the corresponding groove 708*a* to a corresponding opening 762 at an end surface 764 of the body 706. More specifically, the passage 708*b* of each fiber alignment structure 708 extends along a path which is at least partially curved and which extends away from the end of the corresponding groove 708*a* to the corresponding opening 762 at the end surface 764 of the body 706.

In use, an end of a fiber is inserted from the first surface 760 of the body 706 into one of the grooves 708*a* of one of the fiber alignment structures 708. The end of the fiber is moved along the groove 708*a* of the fiber alignment structure 708 and through the corresponding passage 708*b* of the fiber alignment structure 708 until the end of the fiber protrudes through the opening 762 in the end surface 764 of the body 706. The fiber is then secured or bonded in place in the fiber alignment structure 708, for example using epoxy. An end face of the fiber and the end surface 764 of the body 706 may then be processed to provide an optically smooth surface finish, for example by polishing the end face of the fiber and the end surface 764 of the body 706.

One of ordinary skill in the art will understand that an optical fiber has a limited degree of flexibility. Consequently, when an optical fiber extends through the passage 708*b*, the at least partially curved path of the passage 708*b* causes an outer surface of the optical fiber to engage a wall of the passage 708*b* at a position adjacent the opening 762 such that the optical fiber is positioned at a more predictable position relative to the opening 762 which depends on the tolerances associated with the manufacturing of the passage 708*b* and of the optical fiber. Consequently, the apparatus 702 may facilitate more accurate positioning of optical fibers relative to the apparatus 702. This may be advantageous when positioning an assembly including the apparatus 702 and a plurality of optical fibers relative to an optical component and/or a photonic chip which are separate from the assembly for efficient optical coupling between the optical fibers on the one hand and the optical component and/or the photonic chip on the other hand.

As will be appreciated from the foregoing description, the groove 708*a* of each fiber alignment structure 708 helps to guide the end of the fiber into the corresponding passage 708*b* during assembly. The presence of the grooves 708*a* can assist with maintaining fiber positions when ribbonised or non-ribbonised fiber is used.

As will be described in more detail below, the body 706 comprises a monolithic block of the material and the fiber alignment structures 708 may be formed in the material of the monolithic block. In particular, the fiber alignment structures 708 may be formed by using a laser processing procedure to modify the material of the body 706 and by removing the modified material, for example by etching. Additionally or alternatively, the fiber alignment structures 708 may be formed by using a laser processing procedure to ablate the material of the body 706. In contrast, conventional fiber alignment V-groove arrays are two-piece constructions, requiring a lid piece to be placed over the fibers in order to push each fiber into contact with the corresponding V-groove. Consequently, the apparatus 702 provides a monolithic solution for positioning an array of optical fibers which does not require additional pieces to house the fibers robustly. Moreover, the apparatus 702 is easier to assemble, has reduced dimensions, and allows greater flexibility to select fiber angle and depth.

In a variant of the apparatus 702 of FIGS. 8A and 8B, each groove 708*a* may comprise a V-groove.

Although the apparatus 702 of FIGS. 8A and 8B is configured to accommodate a plurality of optical fibers, it should be understood that in a variant of the apparatus 702 of FIGS. 8A and 8B, the apparatus may be configured to accommodate a single optical fiber.

Referring to FIGS. 9A and 9B there is shown a ninth optical fiber positioning apparatus 802 for a ninth assembly, wherein the apparatus 802 is configured for positioning a plurality of optical fibers relative to the apparatus 802. The apparatus 802 includes a body 806 formed from a glass material, and a plurality of fiber alignment structures 808, wherein each fiber alignment structure 808 comprises a groove 808*a* and a corresponding passage 808*b*, wherein the groove 808*a* and the corresponding passage 808*b* are arranged end-to-end, and wherein each fiber alignment structure 808 is configured to accommodate a corresponding optical fiber extending along the corresponding groove 808*a* and the corresponding passage 808*b*.

The groove 808*a* of each fiber alignment structure 808 is defined in an upper surface 860 of the body 806 and extends from a first end surface 861 of the body 806 to an end of the corresponding passage 808*b*. The groove 808*a* of each fiber alignment structure 808 comprises a V-groove.

The passage 808*b* of each fiber alignment structure 808 extends from the end of the corresponding groove 808*a* to a corresponding opening 862 at a second end surface 864 of the body 806.

In use, an end of a fiber is inserted from the first end surface 861 of the body 806 into one of the grooves 808*a* of one of the fiber alignment structures 808. The end of the fiber is moved along the groove 808*a* and through the corresponding passage 808*b* of the fiber alignment structure 808 until the end of the fiber protrudes through the opening 862 in the second end surface 864 of the body 806. The fiber is then secured or bonded in place in the fiber alignment structure 808, for example using epoxy. An end face of the fiber and the second end surface 864 of the body 806 may then be processed to provide an optically smooth surface finish, for example by polishing the end face of the fiber and the second end surface 864 of the body 806.

As will be appreciated from the foregoing description, the groove 808*a* of each fiber alignment structure 808 helps to guide the end of the fiber into the corresponding passage 808*b* during assembly. The presence of the grooves 808*a* can assist with maintaining fiber positions when ribbonised or non-ribbonised fiber is used.

As will be described in more detail below, the body 806 comprises a monolithic block of the material and the fiber alignment structures 808 may be formed in the material of the monolithic block. In particular, the fiber alignment structures 808 may be formed by using a laser processing procedure to modify of the material of the body 806 and by removing the modified material, for example by etching. Additionally or alternatively, the fiber alignment structures 808 may be formed by using a laser processing procedure to ablate the material of the body 806. In contrast, conventional fiber alignment V-groove arrays are two-piece constructions, requiring a lid piece to be placed over the fibers in order to push each fiber into contact with the corresponding V-groove. Consequently, the apparatus 802 provides a monolithic solution for positioning an array of optical fibers which does not require additional pieces to house the fibers robustly. Moreover, the apparatus 802 is easier to assemble, has reduced dimensions, and allows greater flexibility to select fiber angle and depth.

In a variant of the apparatus 802 of FIGS. 9A and 9B, each groove 808*a* may comprise a U-groove like the U-grooves described with reference to FIG. 7.

Although the apparatus 802 of FIGS. 9A and 9B is configured to accommodate a plurality of optical fibers, it should be understood that in a variant of the apparatus 802 of FIGS. 9A and 9B, the apparatus may be configured to accommodate a single optical fiber.

Figure 10:
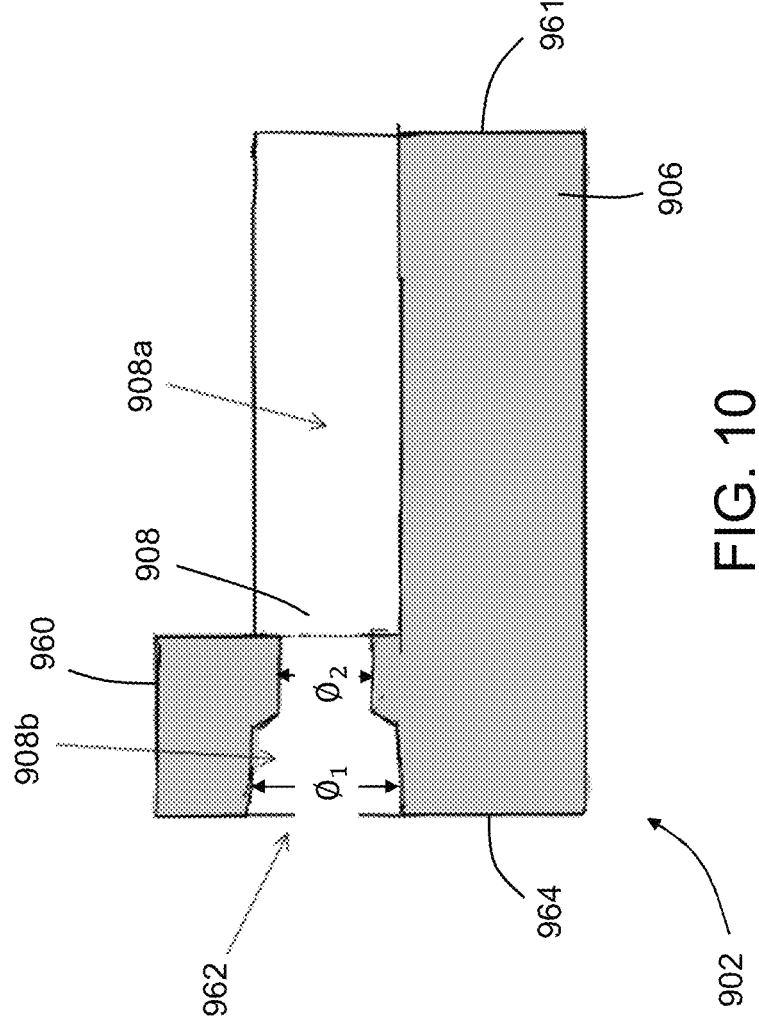
FIG. 10 is a schematic longitudinal cross-section of a tenth optical fiber positioning apparatus.

Referring to FIG. 10 there is shown a tenth optical fiber positioning apparatus 902 for a tenth assembly, wherein the apparatus 902 is configured for positioning one or more optical fibers relative to the apparatus 902. The apparatus 902 includes a body 906 formed from a glass material, and one or more fiber alignment structures 908, wherein each fiber alignment structure 908 comprises a groove 908*a* and a corresponding passage 908*b*, wherein the groove 908*a* and the corresponding passage 908*b* are arranged end-to-end, and wherein each fiber alignment structure 908 is configured to accommodate a corresponding optical fiber extending along the groove 908*a* and the corresponding passage 908*b*.

The groove 908*a* of each fiber alignment structure 908 is defined in an upper surface 960 of the body 906 and extends from a first end surface 961 of the body 906 to an end of the corresponding passage 908*b*. The groove 908*a* of each fiber alignment structure 908 may comprise a V-groove or a U-groove like the U-grooves described with reference to FIG. 7.

The passage 908*b* of each fiber alignment structure 908 extends from the end of the corresponding groove 908*a* to a corresponding opening 962 at a second end surface 964 of the body 906. Moreover, the passage 908*b* of each fiber alignment structure 908 comprises a first longitudinal section having a first diameter $\emptyset_1$ for accommodating a first longitudinal section of a corresponding optical fiber and a second longitudinal section having a second diameter $\emptyset_2$ for accommodating a second longitudinal section of the corresponding optical fiber, wherein the first diameter $\emptyset_1$ is greater than the second diameter $\emptyset_2$. Specifically, the first diameter $\emptyset_1$ is configured to accommodate a diameter of a buffer layer of the first longitudinal section of the corresponding optical fiber, and the second diameter $\emptyset_2$ is configured to accommodate a diameter of a cladding layer of the second longitudinal section of the corresponding optical fiber. The first longitudinal section of the passage 908*b* of each fiber alignment structure is also flared outwardly towards the opening 962 at the second end surface 964 of the body 906.

In use, an end of a fiber is inserted through the opening 962 at the second end surface 964 of the body 906 into the flared outer end of the passage 908*b* of each fiber alignment structure 908. The end of the fiber is moved through the passage 908*b* and along the corresponding groove 908*a* until the end of the fiber protrudes beyond the first end surface 961 of the body 906. The fiber is then secured or bonded in place in the fiber alignment structure 908, for example using epoxy. An end face of the fiber and the first end surface 961 of the body 906 may then be processed to provide an optically smooth surface finish, for example by polishing the end face of the fiber and the first end surface 961 of the body 906.

As will be appreciated from the foregoing description, the use of a fiber alignment structure 908 which includes a passage 708*b* having longitudinal sections of different diameters may allow a corresponding optical fiber to be fixed more securely in the passage 708*b* for improved robustness. The groove 908*a* of each fiber alignment structure 908 may help to support the end of the corresponding fiber. The groove 908*a* of each fiber alignment structure 908 can assist with maintaining fiber positions when ribbonised or non-ribbonised fiber is used.

As will be described in more detail below, the body 906 comprises a monolithic block of the material and the fiber alignment structures 908 may be formed in the material of the monolithic block. In particular, the fiber alignment structures 908 may be formed by using a laser processing procedure to modify the material of the body 906 and by removing the modified material, for example by etching. Additionally or alternatively, the fiber alignment structures 908 may be formed by using a laser processing procedure to ablate the material of the body 906. In contrast, conventional fiber alignment V-groove arrays are two-piece constructions, requiring a lid piece to be placed over the fibers in order to push each fiber into contact with the corresponding V-groove. Consequently, the apparatus 902 provides a monolithic solution for positioning an array of optical fibers which does not require additional pieces to house the fibers robustly. Moreover, the apparatus 902 is easier to assemble, has reduced dimensions, and allows greater flexibility to select fiber angle and depth.

Figures 11A, 11B:
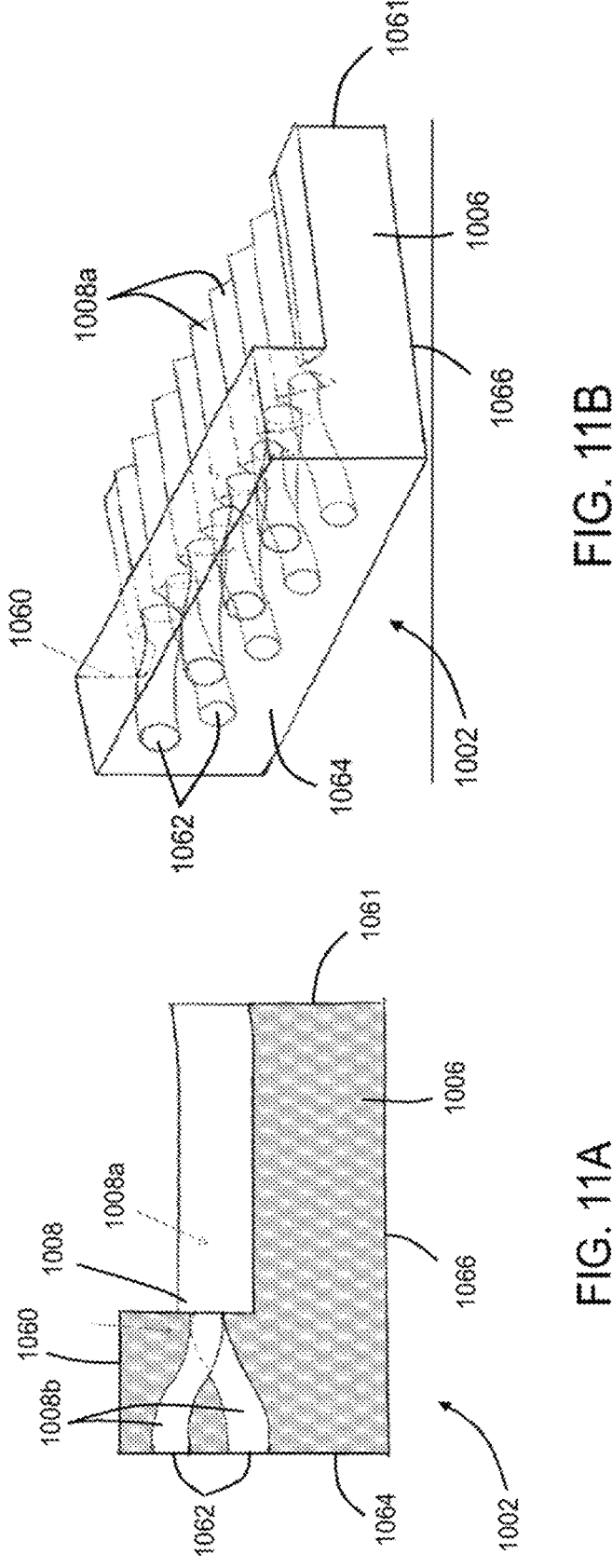
FIG. 11A is a schematic longitudinal cross-section of an eleventh optical fiber positioning apparatus.
FIG. 11B is a schematic perspective view of the eleventh optical fiber positioning apparatus of FIG. 11A.

Referring to FIGS. 11A and 11B there is shown an eleventh optical fiber positioning apparatus 1002 for an eleventh assembly, wherein the apparatus 1002 is configured for positioning a plurality of optical fibers relative to the apparatus 1002. The apparatus 1002 includes a body 1006 formed from a glass material, and a plurality of fiber alignment structures 1008, wherein each fiber alignment structure 1008 comprises a groove 1008*a* and a corresponding passage 1008*b*, wherein the groove 1008*a* and the corresponding passage 1008*b* are arranged end-to-end, and wherein each fiber alignment structure 1008 is configured to accommodate a corresponding optical fiber extending along the groove 1008*a* and the corresponding passage 1008*b*.

The groove 1008*a* of each fiber alignment structure 1008 is defined in an upper surface 1060 of the body 1006 and extends from a first end surface 1061 of the body 1006 to an end of the corresponding passage 1008*b*. The groove 1008*a* of each fiber alignment structure 1008 may comprise a V-groove or a U-groove like the U-grooves described with reference to FIG. 7.

The passage 1008*b* of each fiber alignment structure 1008 extends from the end of the corresponding groove 1008*a* to a corresponding opening 1062 at a second end surface 1064 of the body 1006. Each passage 1008*b* extends along a path which is at least partially curved with the passage 1008*b* of each fiber alignment structure 1008 of a first plurality of alternate fiber alignment structures 1008 curving upwardly towards the upper surface 1060 of the body 1006 and the passage 1008*b* of each fiber alignment structure 1008 of a second plurality of alternate fiber alignment structures 1008 curving downwardly towards a lower surface 1066 of the body 1006. In effect, the first plurality of alternate fiber alignment structures 1008 defines a first linear array of fiber alignment structures 1008 and the second plurality of alternate fiber alignment structures 1008 defines a second linear array of fiber alignment structures 1008, wherein each of the first and second linear arrays of fiber alignment structures 1008 defines a corresponding linear array of openings 1062 at the second end surface 1064 of the body 1006. Moreover, the openings 1062 of the linear arrays of openings 1062 of the first and second linear arrays of fiber alignment structures 1008 are offset relative to one another at the second end surface 1064 of the body 1006 so as to form a two-dimensional array of openings 1062 at the second end surface 1064 of the body 1006. Specifically, the openings 1062 of the linear arrays of openings 1062 of the first and second linear arrays of fiber alignment structures 1008 are offset relative to one another at the second end surface 1064 of the body 1006 in two orthogonal directions. In addition, the grooves 1008*a* of the first and second linear arrays of fiber alignment structures 1008 are interleaved so as to form an interleaved linear array of grooves 1008*a*.

In use, each optical fiber of a first linear array of optical fibers is inserted into each of the fiber alignment structures 1008 of the first linear array of fiber alignment structures 1008 and each optical fiber of a second linear array of optical fibers is inserted into each of the fiber alignment structures 1008 of the second linear array of fiber alignment structures 1008 so as to interleave the optical fibers of the first and second linear arrays of optical fibers. Specifically, an end of each fiber is inserted through the opening 1062 at the second end surface 1064 of the body 1006 into the passage 1008*b* of each fiber alignment structure 1008. The end of the fiber is moved through the passage 1008*b* and along the corresponding groove 1008*a* until the end of the fiber protrudes beyond the first end surface 1061 of the body 1006. The fiber is then secured or bonded in place in the fiber alignment structure 1008, for example using epoxy. An end face of the fiber and the first end surface 1061 of the body 1006 may then be processed to provide an optically smooth surface finish, for example by polishing the end face of the fiber and the first end surface 1061 of the body 1006. The optical fibers of the first linear array of optical fibers are arranged on a first pitch, the optical fibers of the second linear array of optical fibers are arranged on the first pitch, and the openings of the interleaved linear array of openings at the second surface of the body are arranged on a second pitch which is less than the first pitch. In particular, the second pitch may be equal to, or substantially equal to, half the first pitch. For example the second pitch may be equal to, or substantially equal to, 127 μm and the first pitch may be equal to, or substantially equal to, 250 μm.

As will be appreciated from the foregoing description, the groove 1008*a* of each fiber alignment structure 1008 may help to support the end of the corresponding optical fiber. The groove 1008*a* of each fiber alignment structure 908 can assist with maintaining fiber positions when ribbonised or non-ribbonised fiber is used.

As will be described in more detail below, the body 1006 comprises a monolithic block of the material and the fiber alignment structures 1008 may be formed in the material of the monolithic block. In particular, the fiber alignment structures 1008 may be formed by using a laser processing procedure to modify the material of the body 1006 and by removing the modified material, for example by etching. Additionally or alternatively, the fiber alignment structures 1008 may be formed by using a laser processing procedure to ablate the material of the body 1006. In contrast, conventional fiber alignment V-groove arrays are two-piece constructions, requiring a lid piece to be placed over the fibers in order to push each fiber into contact with the corresponding V-groove. Consequently, the apparatus 1002 provides a monolithic solution for positioning an array of optical fibers which does not require additional pieces to house or secure the fibers robustly. Moreover, the apparatus 1002 is easier to assemble, has reduced dimensions, and allows greater flexibility to select fiber angle and depth. It should be understood that although the apparatus 1002 provides a monolithic solution for positioning an array of optical fibers which does not require additional pieces to house or secure the fibers robustly, this does not preclude the apparatus 1002 from being used with one or more additional pieces to house or secure the fibers robustly is this is required for some technical applications. As such, the apparatus 1002 may be considered to provide a versatile solution for positioning an array of optical fibers.

In a further variant of the optical fiber positioning apparatus 1002 of FIGS. 11A and 11B, the passage 1008b of each fiber alignment structure may extend along a path which is configured to direct a corresponding optical fiber along a direction which is angled towards a bottom of the corresponding groove 1008a when the optical fiber is inserted into the passage 1008b through the opening 1062 at one end of the passage 1008b and out through an opening 1063 at the opposite end of the passage 1008b where the passage 1008b meets the corresponding groove 1008a. Specifically, the passage 1008b of each fiber alignment structure may extend along a path which is angled towards a bottom of the corresponding groove 1008a at the opening 1063. For example, the passage 1008b of each fiber alignment structure may be angled towards the lower surface 1066 of the body 1006. The openings 1062 of the passages 1008b of each fiber alignment structure of the first plurality of alternate fiber alignment structures are offset in distance from the lower surface 1066 of the body 1006 by a different amount than the openings 1062 of the passages 1008b of each fiber alignment structure of the second plurality of alternate fiber alignment structures. In such a variant of the optical fiber positioning apparatus 1002 of FIGS. 11A and 11B, insertion of an optical fiber into any opening 1062 through the passage 1008b of the fiber alignment structure 1008 and out through the opening 1063 at the opposite end of the passage 1008b where the passage 1008b meets the corresponding groove 1008a causes the optical fiber to be directed towards, and forced into contact with, the bottom of the corresponding groove 1008a to thereby induce one or more bends in the optical fiber and ensure the optical fiber adopts a more predictable position relative to the corresponding groove 1008a, the corresponding passage 1008b and the corresponding opening 1062. Additionally or alternatively, the passage 1008b of each fiber alignment structure may extend along a path which is at least partially curved. Additionally or alternatively, the passage 1008b of each fiber alignment structure may extend along a path which is at least partially linear. Additionally or alternatively, the groove 1008a and the corresponding passage 1008b of each fiber alignment structure may extend along non-parallel paths such as non-parallel linear paths.

Various optical fiber positioning apparatus have been described above in which the material of the body in which the apparatus are formed or defined is glass. Any suitable glass material can be used, for example glasses such as fused silica, silicates, borosilicates, doped or modified silicates, phosphate glasses, doped or modified phosphates, chalcogenide glasses, doped or modified chalcogenides.

The material of the body may be a material other than glass. The material of the body may be a crystalline material such as lithium niobate, yttrium aluminium garnet or doped, poled or modified crystals such as periodically poled lithium niobate.

Any of the optical fiber positioning apparatus described above can be formed by a method comprising using a laser to modify the material of the body in selected regions and then removing the modified material from the selected regions, for example by etching. Various examples of laser processing techniques which may be used to produce any of the optical fiber positioning apparatus described above are described in WO 2008/155548, WO 2011/154701, WO 2019/166803 and WO 2019/122914 the contents of which are hereby incorporated by reference. Additionally or alternatively, any of the optical fiber positioning apparatus described above can be formed by a method comprising using a laser to ablate the material of the body in selected regions.

Figure 12:
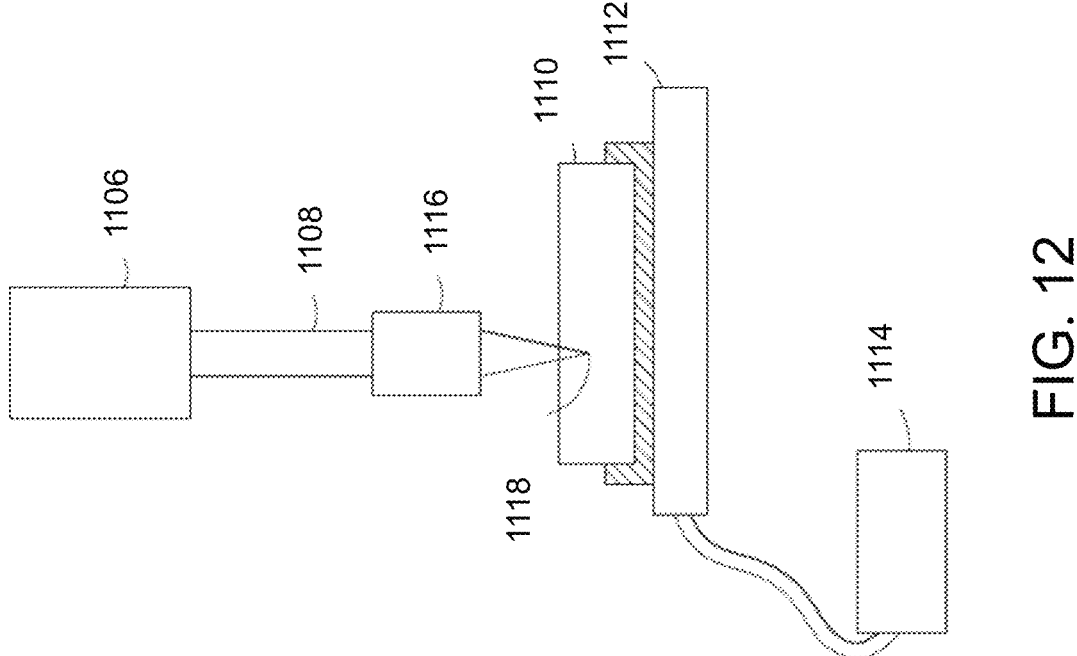
FIG. 12 is a schematic of a laser system for forming a fiber positioning apparatus.

FIG. 12 shows a laser system for defining a fiber positioning apparatus with one or more fiber alignment structures, one or more fiber alignment features and/or one or more apparatus alignment features in the material of the body, for example in a bulk sample. The laser system comprises a laser 1106 that has an associated acousto-optic modulator that can modulate a pulse train from the laser 1106. The laser 1106 has an external compressor stage, for emitting a beam of laser radiation 1108 for use in forming structures or features in a radiation sensitive material 1110, for example suitable glass or crystalline material. The material 1110 is carried in a sample space on a stage structure 1112 that can be moved under the control of a computer based control unit 1114. The control unit also controls operation of the laser 1106.

In operation, the beam 1108 is focused vertically down onto the material 1110 by a lens system 1116. The laser system may be mounted to a support structure (not shown) to minimize vibration and thermal movements. The beam reaches a focal point 1118 in the material 1110. The translation of the sample through the focus results in laser modification of the material at desired positions and to provide desired effects. In alternative embodiments, the material 1110 remains stationary and the laser beam 1108 is moved relative to the material 1110.

Through tailoring of the laser parameters, for example under control of the control unit 1114, such as power, polarization, pulse length, pulse repetition rate, wavelength and/or speed of translation, structures can be created with desired properties. The laser parameters that are used depend on the material properties of the sample, and on the desired modifications. Examples of suitable laser processing parameters are provided in WO 2008/155548, WO 2011/154701, WO 2019/166803 and WO 2019/122914 the contents of which are hereby incorporated by reference. In some embodiments, pulse durations from 10 fs to 20 ps, for example 200 fs, pulse repetition rates from 1 kHz to 1 GHz, and pulse energies from 10 nJ to 1 mJ may be used, but any other suitable laser processing parameters may be used in accordance with known laser processing techniques.

By performing the laser processing for defining each of the apparatus alignment features and one or both of the fiber alignment structures and the fiber alignment features during the same laser processing procedure, for example, without removing the material 1110 from, or altering its position on, the stage structure, accurate alignment of the apparatus alignment features and one or both of the fiber alignment structures and the fiber alignment features can be assured in an efficient manner as mentioned above.

As mentioned above, the laser processing can comprise laser ablation as well as, or instead of, laser modification of material properties followed by etching, or any other suitable laser processing technique. Again, in such embodiments, the material 1110 may be maintained in the same position on a sample stage 1112 or similar structure whilst the laser ablation and/or machining to produce both the apparatus alignment features and one or both of the fiber alignment structures and the fiber alignment features.

Following laser processing by irradiating the material with a focused ultrashort pulsed laser to induce regions of enhanced chemical etch rate, the glass material is then placed in an etch solution (e.g. KOH or HF based) and the regions which have been irradiated etch preferentially with respect to the surrounding material. After etching, surfaces can be processed to improve the surface quality, which can for example consist of a $CO_2$ laser polishing process, a flame polishing process or a chemical smoothing process, as mentioned above. Different etch solutions may be used for different materials.

Each feature disclosed or illustrated in the present specification may be incorporated in any embodiment, either alone, or in any appropriate combination with any other feature disclosed or illustrated herein. In particular, one of ordinary skill in the art will understand that one or more of the features of the embodiments of the present disclosure described above with reference to the drawings may produce effects or provide advantages when used in isolation from one or more of the other features of the embodiments of the present disclosure and that different combinations of the features are possible other than the specific combinations of the features of the embodiments of the present disclosure described above. For example, any of the passages of any of the apparatus 202, 802, 902 may extend along a path which is at least partially curved. Any of the grooves of any of the apparatus 302, 402, 502, 602, 802, 902, 1002 may extend along a path which is at least partially curved.

Any of the apparatus 2, 102, 402, 502, 602, 702, 802, 902, 1002 may include one or more fiber alignment features such as one or more protrusions protruding from a surface of any of the fiber alignment structures 8, 108, 408, 508a, 508b, 608, 708, 808, 908, 1008 like the protrusions 230, 330 for more accurately positioning an optical fiber relative to the apparatus 2, 102, 402, 502, 602, 702, 802, 902, 1002. Any of the apparatus 2, 102, 202, 302, 402, 502, 602, 702, 802, 902, 1002 may include one or more recesses defined in a surface of any of the fiber alignment structures 8, 108, 208, 308, 408, 508a, 508b, 608, 708, 808, 908, 1008 for more accurately positioning an optical fiber relative to the apparatus 2, 102, 202, 302, 402, 502, 602, 702, 802, 902, 1002.

Any of the apparatus 2, 102, 202, 302, 502, 602, 702, 802, 902, 1002 may include one or more apparatus alignment features like the apparatus alignment features 442 of the apparatus 402 of FIG. 5, wherein the one or more apparatus alignment features are formed in the material of the body for passive alignment of the apparatus relative to a member which is separate from the apparatus and which has alignment features which are complementary to the apparatus alignment features, wherein the one or more apparatus alignment features are additional to the one or more fiber alignment structures and wherein the one or more apparatus alignment features have a known spatial relationship relative to the one or more fiber alignment structures. The one or more apparatus alignment features may be defined during the same laser processing procedure used to define the one or more fiber alignment structures. The laser processing procedure may further comprise holding the body in position using a sample stage and providing relative movement between a laser beam and the sample stage, and wherein the one or more fiber alignment structures and the one or more apparatus alignment features are defined during the same laser processing procedure without removing the body from the sample stage and/or without moving the body relative to the sample stage.

At least some of the grooves of the apparatus 302, 402, 602, 702, 802, 902, 1002 may be formed at different depths in a surface of the body.

At least some of the grooves of the apparatus 302, 402, 502, 802, 902, 1002 may be U-shaped.

Any of the passages of any of the apparatus 2, 102, 202, 702, 802, 1002 may comprise a first longitudinal section having a first diameter for accommodating a first longitudinal section of a corresponding optical fiber and a second longitudinal section having a second diameter for accommodating a second longitudinal section of the corresponding optical fiber, wherein the first diameter is greater than the second diameter. For example, the first diameter may be configured to accommodate a diameter of a buffer layer of the first longitudinal section of the corresponding optical fiber, and the second diameter may be configured to accommodate a diameter of a cladding layer of the second longitudinal section of the corresponding optical fiber. The first longitudinal section of the passage of each fiber alignment structure may be flared outwardly towards a surface of the body.

The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Use of the term "comprising" when used in relation to a feature of an embodiment of the present disclosure does not exclude other features or steps. Use of the term "a" or "an" when used in relation to a feature of an embodiment of the present disclosure does not exclude the possibility that the embodiment may include a plurality of such features.

The use of any reference signs in the claims should not be construed as limiting the scope of the claims.

The invention claimed is:

1. An apparatus for positioning one or more optical fibers relative to the apparatus, the apparatus comprising:
   a body comprising a monolithic block of material;
   one or more fiber alignment structures formed in the material of the monolithic block, wherein individual fiber alignment structures of the one or more fiber alignment structures comprise a groove configured to accommodate a corresponding optical fiber;
   one or more apparatus alignment features formed in the material of the monolithic block for passive alignment of the apparatus relative to a component, wherein the one or more apparatus alignment features are additional to the one or more fiber alignment structures; and a plurality of fiber alignment features defined in the material of the body in a surface of individual fiber alignment structures of the one or more fiber alignment structures, wherein the component is separate from the apparatus, wherein the component has one or more alignment features that are complementary to the one or more apparatus alignment features, wherein the one or more apparatus alignment features have a known spatial relationship relative to the one or more fiber alignment structures, wherein individual fiber alignment features of the plurality of fiber alignment features of individual fiber alignment structures of the one or more fiber alignment structures has a known spatial relationship relative to the corresponding fiber alignment structure, and wherein the plurality of fiber alignment features define a position of the corresponding optical fiber relative to the corresponding fiber alignment structure.

2. The apparatus of claim 1, wherein individual fiber alignment structures of the one or more fiber alignment structures are configured to induce one or more bends along the corresponding optical fiber.

3. The apparatus of claim 1, wherein individual fiber alignment structures of the one or more fiber alignment structures extend along a path which is at least partially curved.

4. An apparatus for positioning one or more optical fibers relative to the apparatus, the apparatus comprising:

a body comprising a monolithic block of material;

one or more fiber alignment structures formed in the material of the monolithic block, wherein individual fiber alignment structures of the one or more fiber alignment structures comprise a groove configured to accommodate a corresponding optical fiber;

one or more apparatus alignment features formed in the material of the monolithic block for passive alignment of the apparatus relative to a component, wherein the one or more apparatus alignment features are additional to the one or more fiber alignment structures, wherein the component is separate from the apparatus, wherein the component has one or more alignment features that are complementary to the one or more apparatus alignment features, wherein the one or more apparatus alignment features have a known spatial relationship relative to the one or more fiber alignment structures, wherein individual fiber alignment structures of the one or more fiber alignment structures extend along a path which is at least partially curved wherein individual fiber alignment structures of the one or more fiber alignment structures comprise a passage which extends along the at least partially curved path through the body from a corresponding first opening at a first surface of the body to a corresponding second opening at a second surface of the body, wherein the first and second openings are offset relative to one another, wherein the passage has a clear aperture defined as a difference between a diameter of the passage and the offset, and wherein the clear aperture is less than or equal to a minimum diameter of the corresponding optical fiber.

5. The apparatus of claim 3, wherein individual fiber alignment structures of the one or more fiber alignment structures comprise a passage which extends along the at least partially curved path through the body from a corresponding first opening at a first surface of the body to a corresponding second opening at a second surface of the body, wherein the first and second openings are aligned with one another, wherein the at least partially curved path defines a maximum deviation from a straight line path, wherein the passage has a clear aperture defined as a difference between a diameter of the passage and the maximum deviation, and wherein the clear aperture is less than or equal to a minimum diameter of the corresponding optical fiber.

6. The apparatus of claim 1, wherein individual fiber alignment features of the plurality of fiber alignment features of individual fiber alignment structures of the one or more fiber alignment structures comprises a protrusion which protrudes from a surface of a corresponding fiber alignment structure and/or wherein individual fiber alignment features of the plurality of fiber alignment features of individual fiber alignment structures of the one or more fiber alignment structures comprises a recess which is defined in a surface of a corresponding fiber alignment structure.

7. The apparatus of claim 1, wherein individual fiber alignment structures of the one or more fiber alignment structures comprise a passage which extends through the body and two or more of the fiber alignment features are located at different axial positions defined relative to a longitudinal axis along which the corresponding passage extends, wherein two or more of the fiber alignment features are located at different circumferential positions defined relative to a longitudinal axis along which the corresponding passage extends, wherein two or more of the fiber alignment features are located at the same axial position but different circumferential positions defined relative to a longitudinal axis along which the corresponding passage extends.

8. The apparatus of claim 1, wherein individual fiber alignment structures of the one or more fiber alignment structures comprise a passage comprising a first longitudinal section having a first diameter for accommodating a first longitudinal section of the corresponding optical fiber and a second longitudinal section having a second diameter for accommodating a second longitudinal section of the corresponding optical fiber, wherein the first diameter is greater than the second diameter, wherein the first diameter is configured to accommodate a diameter of a buffer layer of the first longitudinal section of the corresponding optical fiber, and the second diameter is configured to accommodate a diameter of a cladding layer of the second longitudinal section of the corresponding optical fiber, wherein the first longitudinal section of the passage of individual fiber alignment structures of the one or more fiber alignment structures is flared outwardly towards a surface of the body.

9. The apparatus of claim 1, wherein individual fiber alignment structures of the one or more fiber alignment structures comprise a passage, wherein the groove and the passage of individual fiber alignment structures of the one or more fiber alignment structures are arranged end-to-end, and wherein individual fiber alignment structures of the one or more fiber alignment structures are configured to accommodate a corresponding optical fiber extending along the groove and the corresponding passage.

10. The apparatus of claim 9, wherein the groove and the corresponding passage of individual fiber alignment structures of the one or more fiber alignment structures extend along non-parallel paths.

11. The apparatus of claim 9, wherein the passage of individual fiber alignment structures of the one or more fiber alignment structures extends along a corresponding path which is configured to direct a corresponding optical fiber along a direction which is angled towards a bottom of the corresponding groove when the optical fiber is inserted into the passage through an opening at one end of the passage and out through an opening at the opposite end of the passage where the passage meets the corresponding groove, wherein the passage of individual fiber alignment structures of the one or more fiber alignment structures extends along a corresponding path which is angled towards the bottom of the corresponding groove at the opening at the opposite end of the passage where the passage meets the corresponding groove.

12. The apparatus of claim 9, wherein the groove and/or the corresponding passage of individual fiber alignment structures of the one or more fiber alignment structures extend along a corresponding path which is at least partially curved.

13. The apparatus of claim 9, wherein the groove of individual fiber alignment structures of the one or more fiber alignment structures is defined in a first surface of the body and extends from the first surface of the body to an end of the corresponding passage, and the passage of individual fiber alignment structures of the one or more fiber alignment structures extend from the end of the corresponding groove to a corresponding opening at a second surface of the body, wherein the groove of individual fiber alignment structures of the one or more fiber alignment structures is defined in the first surface of the body and a bottom of the groove of individual fiber alignment structures of the one or more fiber alignment structures extends along a corresponding path which is at least partially curved and which extends away from the first surface of the body towards the end of the corresponding passage, wherein the passage of individual fiber alignment structures of the one or more fiber alignment structures extends along a corresponding path which is at least partially curved and which extends away from the end of the corresponding groove to the corresponding opening at the second surface of the body.

14. The apparatus of claim 9, wherein the passage of individual fiber alignment structures of the one or more fiber alignment structures comprises a first longitudinal section having a first diameter for accommodating a first longitudinal section of a corresponding optical fiber and a second longitudinal section having a second diameter for accommodating a second longitudinal section of the corresponding optical fiber, wherein the first diameter is greater than the second diameter, wherein the first diameter is configured to accommodate a diameter of a buffer layer of the first longitudinal section of the corresponding optical fiber, and the second diameter is configured to accommodate a diameter of a cladding layer of the second longitudinal section of the corresponding optical fiber, wherein the first longitudinal section of the passage of individual fiber alignment structures of the one or more fiber alignment structures is flared outwardly towards a surface of the body.

15. The apparatus of claim 9, comprising:

a first linear array of fiber alignment structures defined in the material of the body, individual fiber alignment structures of the one or more fiber alignment structures of the first linear array of fiber alignment structures being configured to accommodate a corresponding optical fiber of a first linear array of optical fibers;

a second linear array of fiber alignment structures defined in the material of the body, individual fiber alignment structures of the one or more fiber alignment structures of the second linear array of fiber alignment structures being configured to accommodate a corresponding optical fiber of a second linear array of optical fibers, wherein individual fiber alignment structures of the one or more fiber alignment structures of the first linear array of fiber alignment structures comprise a groove and a corresponding passage, wherein the groove and the corresponding passage are arranged end-to-end, and wherein the passages of the first linear array of fiber alignment structures define a corresponding linear array of openings at a surface of the body, wherein individual fiber alignment structures of the one or more fiber alignment structures of the second linear array of fiber alignment structures comprise a groove and a corresponding passage, wherein the groove and the corresponding passage are arranged end-to-end, and wherein the passages of the second linear array of fiber alignment structures define a corresponding linear array of openings at the surface of the body, wherein the openings of the first and second linear arrays of fiber alignment structures are offset relative to one another at the surface of the body so as to form a two-dimensional array of openings at the surface of the body and wherein the grooves of the first and second linear arrays of fiber alignment structures are interleaved so as to form an interleaved linear array of grooves.

16. An assembly comprising the apparatus of claim 1 and one or more optical fibers, wherein individual fiber alignment structures of the one or more fiber alignment structures accommodate a corresponding one of the optical fibers.

17. A method for forming an apparatus comprising:

laser processing a body comprising a monolithic block of material to form one or more fiber alignment structures, wherein individual fiber alignment structures of the one or more fiber alignment structures comprise a groove configured to accommodate a corresponding optical fiber; and laser processing the body to form one or more apparatus alignment features for passive alignment of the apparatus relative to a component, wherein the one or more apparatus alignment features are additional to the one or more fiber alignment structures, wherein the component is separate from the apparatus, wherein the component has one or more alignment features that are complementary to the one or more apparatus alignment features, wherein the one or more apparatus alignment features have a known spatial relationship relative to the one or more fiber alignment structures.

18. The method of claim 17, wherein laser processing the body comprises laser modification of the material.

19. The method of claim 17, wherein laser processing the body comprises laser ablation of the material.

* * * * *